United States Patent [19]

Hattori et al.

[11] Patent Number: 5,134,199
[45] Date of Patent: Jul. 28, 1992

[54] DIENE BLOCK POLYMER AND POLYMER COMPOSITION

[75] Inventors: Yasuo Hattori; Yuichi Kitagawa, both of Yokohama; Akira Saito, Fujisawa, all of Japan

[73] Assignee: Asahi Kasei Kogyo Kabushiki Kaisha, Osaka, Japan

[21] Appl. No.: 275,746

[22] Filed: Nov. 23, 1988

[30] Foreign Application Priority Data

| Nov. 27, 1987 | [JP] | Japan | 62-297475 |
| Jan. 27, 1988 | [JP] | Japan | 63-14500 |
| Feb. 29, 1988 | [JP] | Japan | 63-44597 |
| Mar. 9, 1988 | [JP] | Japan | 63-53597 |
| Mar. 9, 1988 | [JP] | Japan | 63-53598 |
| May 25, 1988 | [JP] | Japan | 63-125850 |

[51] Int. Cl.$^5$ ............................. C08F 297/04
[52] U.S. Cl. ............................. 525/314; 525/71; 525/98; 525/99; 525/250; 525/269
[58] Field of Search ............................. 525/314

[56] References Cited

U.S. PATENT DOCUMENTS

| 3,629,213 | 12/1971 | Onishi et al. | |
| 3,726,824 | 4/1973 | Saunders et al. | 525/314 |
| 4,433,109 | 2/1984 | Takeuchi et al. | 525/314 |
| 4,436,873 | 3/1984 | Furukawa et al. | 525/314 |
| 4,547,560 | 10/1985 | Hattori et al. | |
| 4,616,065 | 10/1986 | Hargis et al. | 525/99 |
| 4,619,982 | 10/1986 | Jenkins | |
| 4,669,518 | 6/1987 | Hargis et al. | |
| 4,689,368 | 8/1987 | Jenkins | |
| 4,782,119 | 11/1988 | Tsutsumi et al. | 525/314 |

FOREIGN PATENT DOCUMENTS

| 49-29386 | 3/1974 | Japan . |
| 50-36585 | 4/1975 | Japan . |
| 50-122586 | 9/1975 | Japan . |
| 51-67387 | 6/1976 | Japan . |
| 57-100112 | 6/1982 | Japan . |
| 60-10411 | 1/1985 | Japan . |
| 60-104111 | 6/1985 | Japan . |
| 61-238845 | 10/1986 | Japan . |
| 2161169 | 1/1986 | United Kingdom . |

OTHER PUBLICATIONS

D. K. Jenkins, "Butadiene polymerization with a rare earth compound using a magnesium alkyl cocatalyst:1", Polymer, vol. 26, Jan. 1985, pp. 147–151.

Primary Examiner—Carman J. Seccuro
Attorney, Agent, or Firm—Birch, Stewart, Kolasch & Birch

[57] ABSTRACT

A diene block polymer contains (A) a resinous polybutadiene block having a glass transition temperature of −80° C. or less, a crystalline melting point of 30° to 130° C., 80% to 93% of trans units, 5 to 15% of cis units, and 1 to 10% of vinyl units, a molecular weight of 10,000 to 200,000, and a molecular weight distribution Mw/Mn of 1.2 to 4 and (B) a conjugated diene rubbery block having a glass transition temperature of −20° C. or less and either not having a crystalline melting point or having a crystalline melting point of 0° C. or less, wherein the ratio of blocks (A) to blocks (B) is 2 to 80:98 to 20 (ratio by weight), the molecular weight is 20,000 to 500,000, and the molecular weight distribution $\overline{Mw}/\overline{Mn}$ is 1.1 to 5 and a polymer composition containing the same.

5 Claims, 3 Drawing Sheets

DIENE BLOCK POLYMER AND POLYMER COMPOSITION

BACKGROUND OF THE INVENTION

1. Field of the Invention

The present invention relates to a diene block polymer having an improved cold flow, superior physical properties, and processability in various applications and to a polymer composition having as a principal component the diene block polymer. More specifically, it relates to a block polymer comprised of a resinous polybutadiene block having 80 to 93% trans units and a rubbery diene block and to a polymer composition having the same as one of its principal components.

The diene block polymer and polymer composition of the present invention are diene rubbers with improved cold flow and are suited for all types of applications where diene rubbers have been used in the past. The polymer composition of the present invention, which includes the block polymer, is a raw rubber which gives a composition which has excellent strength, wear resistance, and processability. Having these functional features enables it to be used for tire treads, sidewalls, carcasses, and other tire parts used on trucks, buses, construction vehicles, passenger cars, motorcycles, and bicycles, shock absorbing rubber, belts, and other auto parts, industrial parts, and other rubber applications. Further, it may be excellently used in high impact polystyrene resin applications.

2. Discussion of the Related Art

There is known a polybutadiene with high trans units, e.g., 80 percent or more trans units. As the methods for the production of the same, the following three methods are known: (1) The method comprising the use of a Ziegler catalyst comprised of a transitional metal compound and an organic metal compound, (2) the method comprising the use of an anionic polymerization catalyst having as a principal component an alkaline earth metal compound, and (3) the method comprising the use of a catalyst having as a principal component a rare earth metal compound.

The method of the above-mentioned (1) uses as principal components transitional metal compounds of nickel, cobalt, titanium, vanadium, etc., and enables the polymerization to form a polymer having a high degree of stereospecificity. For example, as a polymerization method of butadiene using titanium metal, there is the method of use of a carrier of a tetravalent titanium metal compound with magnesium halogenate (Japanese Unexamined Patent Publication (Kokai) No. 51-67387). Further, in the case of using a vanadium compound as the principal component, it is possible to obtain a polymer having a very high trans content. For example, methods are known for polymerizing isoprene using a composite catalyst of a tetravalent vanadium halogenate and organic aluminum (Japanese Unexamined Patent Publication (Kokai) No. 50-36585) and further for polymerizing isoprene using a composite catalyst comprised of a trivalent or tetravalent vanadium compound and organic aluminum and tetravalent titanium compound (Japanese Unexamined Patent Publication (Kokai) No. 49-29386 and Japanese Unexamined Patent Publication (Kokai) NO. 50-122586) etc.

In the above method of (2), there are examples of the polymerization of butadiene using as principal components, barium, strontium, and calcium compounds, e.g., barium-di-tert-butoxide and organic lithium (U.S. Pat. No. 3,629,213) or barium-di-tert-butoxide and organic magnesium (Japanese Unexamined Patent Publication (Kokai) No. 52-48910), etc. Further, there is known the method of the polymerization of a conjugated diene using an organometallic compound of an organic compound of barium or strontium and organolithium and IIB or IIIA metal, etc.

In the above method of (3), there are known composite catalysts using rare earth metal compounds as the main catalysts and organomagnesium compounds as the secondary catalysts. For example, Japanese Unexamined Patent Publication (Kokai) No. 59-1508 and U.S. Pat. No. 4,689,368 proposes a method using rare earth metal such as Di, Nd, Pr, and other varsaticates or special α- and γ-diketone complexes to produce high trans polybutadiene and a diene block polymer comprised of high trans block and high cis block.

Further, Japanese Unexamined Patent Publication (Kokai) No. 61-19611 and GB 2161169 proposes compounds of cerium and europium, and Japanese Unexamined Patent Publication (Kokai) No. 61-97311 proposes polymerization using the same type of catalysts using compounds of lanthan as the main catalysts, which produce with high efficiency polybutadiene with high trans units.

A process for polymerizing butadiene to form polybutadiene having trans units of up to 60 percent using an organolithium compound as a catalyst is also known. Details of the process are disclosed in, for example, "The Stereo Rubber", edited by William M. Saltman, 1977, chapter 4. It is reported therein that by polymerizing butadiene using lithium metal or organolithium compounds under a nonpolar solvent, it is possible to obtain a polymer having 48 to 50% trans units and that the addition of a polar compound to this system results in a rise in the 1,2-bonds and a decline in the 1,4-bonds (cis units and trans units).

Further, there have been proposed a polymer having as one of its components a block polymer of a high trans butadiene copolymer and high vinyl bond butadiene polymer and a method for production of the same (Japanese Unexamined Patent Publication (KoKai) No. 61-238845 and U.S. Pat. No. 4,669,518).

According to that specification (claim 1), there was proposed the following:

"A composition including a rubber polymer selected form the group consisting of the following:

I. A diblock copolymer of a high trans copolymer and high vinyl polymer,

II. A blend of a high trans copolymer and high vinyl polymer, and

III. A blend or mixture of a diblock copolymer of a high trans copolymer and high vinyl copolymer, a high trans copolymer, and a high vinyl polymer, wherein a) the high trans copolymer is a copolymer of butadiene-1,3 and at least one copolymerizable monomer selected from the group consisting of styrene and isoprene, which has a Tg of less than about −70° C., which has a total content of about 75 to 85% of trans units and up to about 8% of vinyl units in the butadiene segments, and which accounts for 25 to 80% by weight of the composition, b) the high vinyl polymer is at least one polymer selected from the group consisting of copolymers of homopolybutadiene, at least one monomer selected from the group composed of styrene and isoprene, and butadiene-1,3, which has a Tg larger than about −70° C. and not exceeding about −35° C. and which has about 40 to 80% vinyl units in the butadiene segment, c) further, in the composition, the total amount of styrene and/or isoprene is about 5 to about 20% by weight and the total amount of vinyl units is about 30 to 60%."

Further, a method for producing this polymer composition is given in claim 9. The gist of the same is given in the specification as follows:

"The method for production of the HTSBR-b-HVSBR involves the copolymerization of butadiene and styrene in cyclohexane to a conversion of about 60 to 95%, preferably about 85% by using a barium salt of alcohol combined with an organomagnesium compound and organoaluminum compound or organomagnesium/organoaluminum complex for formation of HTSBR (block A) followed by addition of sodium (preferably), potassium, or rubidium alcoholate or their mixture and a strong Lewis acid or, if desired, an additional monomer for formation of the HVSBR (block B). The SBR produced has styrene units with a dominant random distribution in each block. The high content of trans-1,4 positions in block A causes somewhat of a crystallinity, as observed by differential scanning calorimetry (DSC) and the crystal melting point, but the crystal melting point can be lowered to close to room temperature (about 25° C.) or lower by adjustment of the trans-1,4 content and styrene level. The polymers formed have reduced ordinary temperature flow and superior processability".

However, in each of the above-mentioned methods and polymers, the activity of the polymerization giving trans copolymer portion in the first stage is extremely low and further, the second stage polymerization is inferior in living ability and gives rise to an unpreferably enlarged distribution of molecular weight, a reduced ratio of block polymers such as HTSBR-b-HVSBR in the resultant polymer composition, and an increased ratio of HTSBR homopolymers. Further the resultant polymer has a higher Tg value compared with the homopolymer due to the first block being a high trans copolymer. The Tm value (crystal melting point) is also low or else nonexistent. The superior physical properties of rubber given by the high trans block portion (improved cold flow, hardness, improved modulus, improved wear resistance, etc.) are insufficiently exhibited and, conversely, the increase of the high trans copolymer portion to an amount higher than necessary causes a decline in the heat resistance and low temperature performance and thus is not preferred.

Accordingly, the objects of the present invention are to eliminate the above-mentioned problems of the prior art and to provide a diene block polymer having an improved cold flow, excellent physical properties, and workability.

Another object of the present invention is to provide a polymer composition containing the above-mentioned diene block polymer.

Other objects and advantages of the present invention will be apparent from the following description.

SUMMARY OF THE INVENTION

In accordance with the present invention, there is provided a diene block polymer comprising (A) a resinous polybutadiene block having a glass transition temperature of −80° C. or less, a crystalline melting point of 30° to 130° C., 80 to 93% of trans units, 5 to 15% of cis units, and 2 to 10% of vinyl units, a molecular weight of 10,000 to 200,000, and a molecular weight distribution $\overline{Mw}/\overline{Mn}$ of 1.2 to 4 and (B) a conjugated diene rubbery block having a glass transition temperature of −20° C. or less and either not having a crystalline melting point or having a crystalline melting point of 0° C. or less, wherein the ratio of block (A) to block (B) is 2 to 80:98 to 20 (ratio by weight), the molecular weight is 20,000 to 500,000, and the molecular weight distribution $\overline{Mw}/\overline{Mn}$ is 1.1 to 5.

In accordance with the present invention, there is also provided a polymer composition containing the above-mentioned diene block polymer as main components.

BRIEF DESCRIPTION OF THE DRAWINGS

The present invention will be better understood from the description set forth below with reference to the accompanying drawings in which.

DESCRIPTION OF THE PREFERRED EMBODIMENTS

Figure 1:
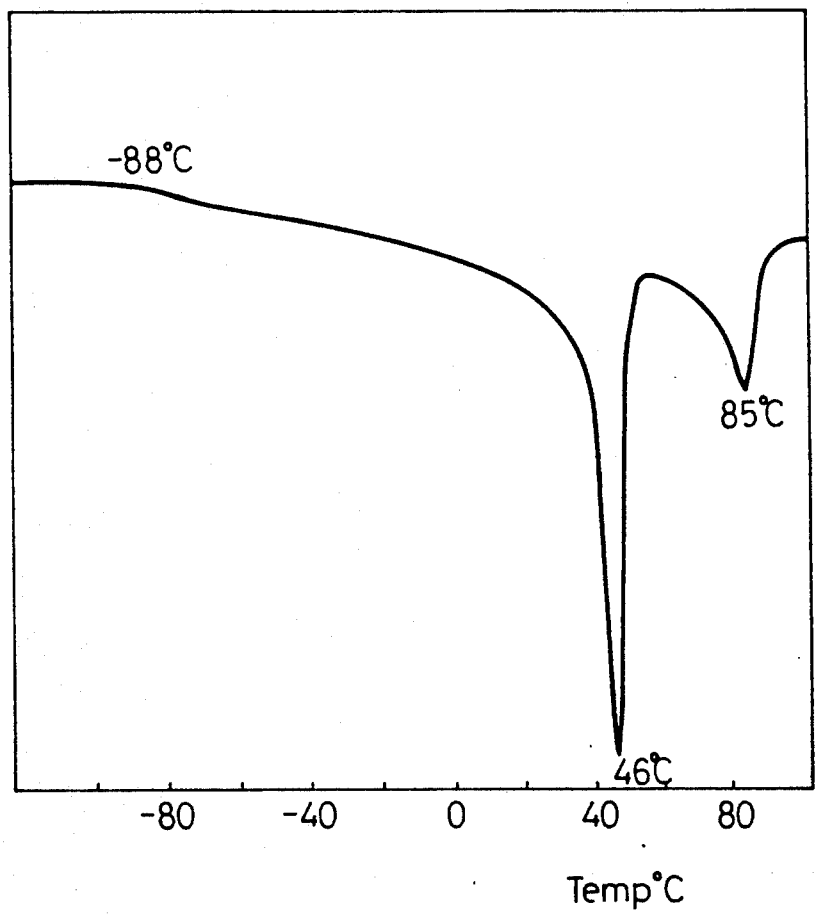
FIG. 1 is a DSC chart of the polymer in Example Group I.

The high trans resinous polybutadiene block (A) of the present invention is a resinous polybutadiene having a glass transition temperature of −80° C. or less, a crystalline melting point of 30° to 130° C., 80 to 93% of trans units, 5 to 15% of cis units, and 2 to 10% of vinyl units. With blocks out of this range, the superior effects of the present invention cannot be obtained. That is, when the glass transition temperature exceeds −80° C., the wear resistance and the resilience of the vulcanized rubber are inferior and when the crystal melting point is 30° C. or less, the cold flow is inferior and the wear resistance and strength of the vulcanized rubber, etc., decline. If the crystal melting point exceeds 130° C., there is insufficient cross-linking of the trans polymer block portion, the strength falls, and the heat build-up deteriorates. Further, when the trans units are less than 80% and the cis units and vinyl units exceed 15% and 10%, respectively, the cold flow deteriorates and the wear resistance, strength, modulus, and hardness decline.

On the other hand, when the cis units are less than 5% and the vinyl units less than 2%, the crystallization at low temperature becomes significantly faster and the low temperature properties become inferior.

The high trans resinous polybutadiene block of the present invention preferably has a glass transition temperature of −83° C. to −120° C., particularly preferably −85° C. to −110° C., and a crystalline melting point of 40° C. to 120° C., particularly preferably 50° C. to 110° C. Therefore, it is preferable that the trans units be 83 to 93%, particularly 85 to 92%. The molecular weight of the high trans resinous polybutadiene block is 10,000 to 200,000, particularly preferably 30,000 to 150,000. With a molecular weight of less than 10,000, the feature of the present invention, i.e., the effect of improved cold flow, cannot be obtained and the wear resistance, strength, and other properties cannot be improved. On the other hand, with a molecular weight of over 200,000, there is the problem that the polymer becomes too hard at room temperature and conversely becomes hard to work. Here, the molecular weight is the weight average molecular weight $\overline{M}w$.

Further, the molecular weight distribution $\overline{M}w/\overline{M}n$ is 1.1 to 4, preferably 1.1 to 3.5, more preferably 1.2 to 3. When the molecular weight distribution $\overline{M}w/\overline{M}n$ exceeds 4, not only is the effect of improvement of the wear resistance and strength small, but there is the problem of a deteriorated heat build-up.

The conjugated diene rubbery block (B) in the present invention is a conjuagted diene polymer block having a glass transition temperature of $-20°$ C. or less and having no crystalline melting point or a crystalline melting point of $0°$ C. or less. When outside of this range, the superior effects of the present invention cannot be obtained. That is, if the glass transition temperature exceeds $-20°$ C. or there is a crystalline melting point of over $0°$ C., the rubber elasticity of the polymer in the low temperature range is lost and, when vulcanized, the rubber exhibits inferior wear resistance and heat build-up. With high impact polystyrene resin, the impact strength becomes inferior. In particular, it is preferable that there be no crystalline melting point.

The molecular weight of the conjugated diene rubbery polymer block (B) is preferably 20,000 to 400,000, more preferably 50,000 to 300,000. When the molecular weight is too low, the wear resistance, resilience, tensile strength, and other physical properties become inferior and when the molecular weight is too high, the mill behavior, extrudability, and other processability features become inferior. The molecular weight here is the weight average molecular weight. Further, the molecular weight distribution $\overline{M}w/\overline{M}n$ of the conjugated diene rubbery block (B) is preferably 1.1 to 8, more preferably 1.1 to 5. When the molecular weight distribution is too broad, the resilience, heat build-up, etc., are inferior.

The conjugated diene units comprising the conjugated diene block (B) in the present invention are $C_4$ to $C_{10}$ conjugated dienes, for example, one or more of butadiene, isoprene, 2,3-dimethyl-1,3-butadiene, 1,3-pentadiene, 2,4-hexadiene, 2-phenyl-1,3-butadiene, etc. or copolymers of these conjugated dienes and vinyl monomers copolymerizable with the same, for example, styrene, α-methylstyrene, vinyltoluene, diphenylethylene, methoxystyrene, divinylbenzene, 1-vinylnaphthalene, etc., preferably polybutadiene, polyisoprene, and styrene-butadiene random copolymers.

When the conjugated diene rubbery block (B) is polybutadiene, the microstructure has 20 to 60% trans units, 20 to 40% cis nits, and 10 to 40% vinyl units. Outside of this range, the effects of the present invention are small. In particular, when the block polymer or the polymer composition of the present invention are used as a toughening agent of a high impact polystyrene resin and when the rubber elasticity of the vulcanized rubber at low temperature is needed, it is important that the microstructure be in this range.

When the conjugated diene rubbery block (B) is a styrene-butadiene random copolymer, the monomer units should have a styrene content of 1 to 50% by weight and the microstructure of the butadiene portion should be 20 to 60% trans units, 20 to 40% cis units, and 10 to 40% vinyl units or 10 to 40% trans units, 10 to 30% cis bonds, and 40 to 80% vinyl bonds. When the block polymer or polymer composition of the present invention is used as the raw rubber for tires, where the wear resistance is emphasized, the former range is preferable, while when it is used as the raw rubber of tires, where the wet skid property is emphasized, the latter range is preferable.

If these ranges are exceeded, the effects of the present invention are difficult to obtain. Further, the styrene-butadiene random copolymer of the conjugated diene rubber block (B) of the present invention, in both of the above cases, requires that the bonding format of the styrene be random. The existence of block styrene causes deterioration of the heat build-up and thus is not preferable. The block styrene is preferably 5% by weight or less of the block polymer of the present invention, more preferably 2% by weight or less. Note that the block styrene is measured by the osmic acid decomposition method (J. Poly. Sci. 1, 429 (1946)).

Further, more preferably, the entire amount is copolymerized randomly. The isolated styrene analyzed by the ozone decomposition-GPC method is 40% by weight or more of the total bound styrene, preferably 50% by weight or more. The long chain block styrene (those with chains of 8 or more styrene units) is 5% by weight or less of the total bonded styrene, preferably 2.5% by weight or less. Complete random copolymerization is performed by the method described in Japanese Unexamined Patent Publication (Kokai) No. 57-100112 and U.S. Pat. No. 4,547,560.

The ratio of the resinous polybutadiene block (A) and conjugated diene rubbery block (B) of the diene block polymer of the present invention is a weight ratio of the block (A): block (B) of 2 to 80:98 to 20. When outside of this range, the superior effects of the present invention cannot be obtained. That is, when the ratio of the block (A) is too low, the feature of the present invention of improved cold flow is small and the wear resistance, tensile strength, and other properties cannot be improved. On the other hand, when the ratio of the block (A) is too large, the polymer becomes too hard at room temperature and difficult to work and the resilience declines and heat build-up deteriorates. The ratio of the block (A) and block (B) is preferably a weight ratio of 5 to 70:95 to 30, more preferably a weight ratio of 8 to 60:92 to 40.

The diene block polymer of the present invention has a molecular weight of 20,000 to 500,000. When the molecular weight is too low, the strength, impact resilience, wear resistance, and heat build-up become inferior and when too high, the mill behavior, extrudability and other processability features decline. The molecular weight is preferably 50,000 to 450,000, particular preferably 100,000 to 400,000. Here, the molecular weight is the weight average molecular weight $\overline{M}w$.

The molecular weight distribution $\overline{M}w/\overline{M}n$ of the block polymer of the present invention is 1.1 to 5. If the molecular weight distribution is too broad, the resilience, the heat build-up, and other properties become inferior. Preferably, it is 3.5 or less, more preferably 1.2 to 3. In particular, when the resilience, heat build-up, wear resistance, modulus, and other properties are stressed, the $\overline{M}w/\overline{M}n$ is preferably 1.2 to 2.

Next, the polymer composition of the present invention will be explained in detail.

The polymer composition of the present invention has as one of its main components the above-mentioned block polymer. Another of the main components comprising the polymer composition is a rubbery polybutadiene having a glass transition temperature of $-70°$ C. or less, having no crystalline melting point, and having 20 to 60% trans bonds, 20 to 40% cis bonds, and 10 to 40% vinyl bonds, a rubbery butadiene-styrene copolymer having the same type of microstructure and 1 to 50% by weight of bound styrene, or a rubbery butadiene-styrene copolymer having 1 to 50% by weight of bonded styrene, 10 to 40% of trans units, 10 to 30% of cis units, and 40 to 80% of vinyl units. When these rubbery polymers are not in the above-mentioned ranges of microstructures, the superior effects of the present invention cannot be obtained. For example, when the glass transition temperature exceeds −70° C., the wear resistance of the lybutadiene is inferior.

When the trans units exceed 60%, the static and properties of the polymer composition are lost. The molecular weight of the above rubbery polybutadiene and butadiene-styrene copolymer is 20,000 to 400,000. When the molecular weight is less than 20,000, the wear resistance, resilience, tensile strength, and other physical properties are inferior and when the molecular weight exceeds 400,000, the mill behavior, extrudability, and other processability features become inferior. In terms of the balance of the physical properties and processability, the molecular weight of the rubber polymers is preferably 50,000 to 300,000. Here, the molecular weight is the weight average molecular weight.

In the present invention, it is preferable that the polymer composition not include any high trans resinous polybutadiene homopolymer or else that there be less than 30% by weight of the total of the high trans polybutadiene component, that is, the high trans resinous polybutadiene block portion in the block polymer and the high trans resinous polybutadiene homopolymer. In the present invention, if the amount of the high trans resinous polybutadiene homopolymer in the polymer composition is too large, the resilience drops, the heat build-up deteriorates, and other properties decline, so that the less there is the better. In the present invention, it is preferable that the amount of high trans polybutadiene component in the polymer composition be 20% by weight or less, more preferably 10% by weight or less. Even when high trans polybutadiene homopolymer is included, the glass transition temperature of the high trans resinous polybutadiene homopolymer included is limited to −80° C. When over −90° C., the decline of the wear resistance and the resilience are particularly severe. Further, the crystalline melting point is limited to 30° C. or more. When lower than 30° C., not only does the cold flow become inferior, but also the decline in the wear resistance, tensile strength, and the like become severe. Further, the crystalline melting point must be less than 130° C. When over 130° C., the strength declines and the heat build-up deteriorates. Still further, the trans units must be 80 to 93%, the cis units 5 to 15%, and the vinyl bonds 2 to 10%. When outside of this range, the cold flow becomes inferior and the wear resistance, tensile strength, modulus, and hardness decline. The glass transition temperature is preferably −83° C. or less and the crystalline melting point is preferably 40° to 120° C., more preferably 50° to 110° C., and the trans units 85 to 92%. Further, when the molecular weight is less than 10,000, there is a large detrimental effect on the wear resistance and tensile strength. On the other hand, when the molecular weight is over 200,000, the polymer becomes too hard and when the molecular weight distribution $\overline{M}w/\overline{M}n$ exceeds 4, there is a striking deterioration in the heat build-up.

In the polymer composition of the present invention, the high trans resinous polybutadiene component, i.e., the total of the high trans resinous polybutadiene block portion in the block polymer and high trans resinous polybutadiene homopolymer, is 1 to 70% by weight of the total polymer composition. When the total is less than 1% by weight, the feature of the present invention of improved cold flow is small and the wear resistance, tensile strength, and other properties cannot be improved. On the other hand, when over 70% by weight, the composite polymer becomes too hard at room temperature and difficult to work and, further, the resilience becomes low, so this is not preferable. The total of the high trans resinous polybutadiene block portion and high trans resinous polybutadiene homopolymer in the block polymer is preferably 3 to 60% by weight of the total composite polymer, more preferably 5 to 50% by weight.

The Mooney viscosity $ML_{1+4}$ (100° C.) of the polymer composition of the present invention is 10 to 150. When the Mooney viscosity is too low, the strength, resilience, wear resistance, and heat build-up become inferior and when too high, the mill behavior, extrudability, and other processability features decline. Preferred is a range of 20 to 130. When the Mooney viscosity is 70 or more, it is possible to add 5 to 100 parts of a usual process oil per 100 parts by weight of composite polymer to lower the Mooney viscosity and improve the workability.

The molecular weight distribution of the polymer composition of the present invention $\overline{M}w/\overline{M}n$ is 1.1 to 5. When the molecular weight distribution is too broad, the impact resilience, the heat build up, and other properties become inferior. Preferably, it is 1.2 to 4. Further, when the resilience, heat build up, the wear resistance, the modulus, and other properties are stressed, the $\overline{M}w/\overline{M}n$ is preferably in the range of 1.2 to less than 2, and when a balance among the resilience, heat build-up, wear resistance and the processability, cut growth resistance, etc., is emphasized, the $\overline{M}w/\overline{M}n$ is preferably in the range of 2 to 3.

The preferable polymer composition comprising the polymer composition of the present invention has the component including the high trans resinous polybutadiene component, that is, the total amount of the block polymer comprised of the high trans resinous polybutadiene block and low trans rubbery polybutadiene block and the high trans resinous polybutadiene homopolymer, of 5 to 95% by weight of the total polymer and a low trans rubbery polybutadiene of 95 to 5% by weight. With a component including the high trans rubbery polybutadiene component of less than 5% by weight, the improvement of the cold flow and the improvement of the tensile strength, wear resistance, and other properties of the present invention cannot be obtained. On the other hand, with a low trans rubbery polybutadiene of less than 5% by weight, the rubberiness of the polymer declines and the mill behavior, extrudability, and other processability features decline.

The diene block polymer and polymer composition of the present invention are obtained by the method of production comprised of the steps:

(1) formulating a monomer mixture comprised of butadiene and inert solvent, (2) polymerizing the butadiene to 80% to 93% trans units by a catalyst containing rare earth compounds and organomagnesium compounds at a temperature of 0° to 150° C., (3) then adding to said catalyst an organolithium compound and polymerizing the butadiene to 60% or less trans units at a temperature of 30° to 200° C., and (4) removing the inert solvent from the resultant polymer.

The first step in the present invention is the step of formulating the monomer mixture comprised of butadiene and an inert solvent. The inert solvent used is not particularly limited, so long as it does not cause deactivation of the catalyst used, but n-pentane, n-hexane, n-heptane, cyclohexane, and other aliphatic or alicyclic hydrocarbons, benzene, toluene, and other aromatic hydrocarbons are preferable. Further, it may be a mixture of two or more of the same or one which includes a small amount of impurities. The monomer mixture is formulated to have a monomer concentration of 1 to 50% by weight, preferably 5 to 30% by weight, in which may be included, by molar ratio with respect to the organolithium compound and used in the steps (2) and (3), 1 or less of allenes, for example, propadiene, 1,2-butadiene, 1,2-pentadiene, 1,2-octadiene, and the like. Further, in the mixture, as the polymer component other than the butadiene, may be included a small amount of another monomer component copolymerizable with butadiene, such as isoprene, 2,3-dimethyl-1,3-butadiene, 1,3-pentadiene, 2,4-hexadiene, 2-phenyl-1,3-butadiene conjugated dienes or styrene, alpha-methylstyrene, vinyltoluene, methoxystyrene, divinylbenzene, 1-vinylnaphthalene, and other aromatic hydrocarbons.

The second step of the present invention is the step for polymerizing the butadiene with a catalyst comprised of a rare earth compound and organomagnesium compound at a temperature of 0° to 150° C. to 80 to 93% trans bonds. As the main component of the catalyst, i.e., the rare earth compound, mention may be made of, as rare earth elements, lanthanum, cerium, praseodymium, neodium, samarium, europium, gadolinium, and other elements of element numbers 57 to 71, preferably as elements lanthanum, cerium, neodium, and europium, with organic salts of these being suitably used. The organic acid salts of rare earths can be easily obtained by, for example, causing a reaction of the following organic acids of alkaline metals and lanthanum chloride in water or alcohol, ketones, or other organic solvents.

As the organic oxides comprising the above-mentioned organic acids of alkaline metals, there are alcohol, thioalcohol, phenol, thiophenol, carboxylic acid, thiocarboxylic acid, alkylarylsulfonic acid, and sulfuric acid moncalechol ester, diester phosphates of ethyleneoxide addition products of alcohol or phenol, diester phosphites of ethylene oxide addition products of alcohol or phenol, pentavalent organic phosphoric acid compounds, trivalent phosphoric acid compounds, etc.

The other catalyst component, organomagnesium compounds, are expressed by the following general formula:

Mg.R.R' where R and R' indicate aliphatic hydrocarbon radicals or aromatic hydrocarbon radicals, which may be the same or different.

For example, mention may be made of diisopropyl magnesium, di-n-butyl magnesium, di-sec-butyl magnesium, MAGALA-6E, -7.5E, etc.

The above-mentioned catalysts have extremely high activities, and the amount of the catalyst used is preferably 0.01 to 1 m mole of rare earth compound component per 100 g of conjugated diene monomer to be polymerized, preferably 0.05 to 0.6 m mole. The organomagnesium component is shown by the same concentration per 100 g of conjugated diene monomer and is 0.02 to 10 m mole, more preferably 0.1 to 6 m mole.

The constituent components of the above-mentioned catalyst are shown by the ratio of the rare earth compound (a) and organomagnesium (b), with (a)/(b) being in the range of from 1/0.1 to 1/50, more preferably 1/0.5 to 1/10.

The above-mentioned catalyst may be enhanced further in its polymerization activity by the co-presence, in addition to the two components, of one or more components among organolithium compounds, organoaluminum compounds, and electron-donor compounds in a molar ratio of 1/10 or more of the organomagnesium compound.

If an organolithium compound is made co-present, it is possible to change the content of the trans units in the resultant conjugated diene polymer by the amount of the organolithium compound. In general, the larger the amount of the organolithium compound used, the greater the polymerization activity and, on the other hand, the less the content of trans bonds in the resultant conjugated diene polymer. However, when a suitable amount is used, it becomes possible to obtain at a high activity a polymer having a high trans units. Therefore, the amount of the organolithium compound to be used differs depending on the desired content of trans units in the polymer, but when trying to obtain a content of trans units of the present invention of 80 to 93%, while depending on the polymerization temperature, expressed by the ratio of the lithium atoms in the organolithium compound and the magnesium atoms in the organomagnesium compound, the Li/Mg molar ratio must be 1.5 or less. In particular, when trying to obtain a polymer with a trans unit of 85 to 92%, the same Li/Mg molar ratio is desirably 0.7 or less.

Note that the details of the above-mentioned catalyst are given in Japanese Unexamined Patent Publication (Kokai) No. 61-97311.

The polymerization is performed using the above-mentioned catalyst at 0° C. to 150° C., preferably 30 to 120° C. The form of the polymerization may be the batch method or the continuous method. The polymer obtained at step (2) having 80 to 93% trans units and is a resinous polybutadiene. The polymerization is proceeded with so that the ratio of that portion in the block polymer or the polymer composition becomes the predetermined ratio, then in the following step (3) organolithium compound is further added to the above-mentioned catalyst, the conjugated diene polymerized at a temperature of 50° to 200° C., and a rubbery conjugated diene polymer formed. The organolithium compound which is additionally added may be, giving suitable examples, n-butyl lithium, sec-butyl lithium, tert-butyl lithium, 1,3-bis(1-lithio-1,3-dimethylpentyl)benzene, and other organolithium compounds.

The amount added depends on the polymerization temperature, but, expressed in terms of the ratio of the lithium atoms in the organolithium compound and the magnesium atoms in the organomagnesium compound, the Li/Mg molar ratio is 1 to 5, preferably 1.6 to 2.8, more preferably 1.8 to 2.4. When the Li/Mg molar ratio is small, the trans content rises and the result is a rubbery conjugated diene polymer block having a crystal melting point of over 0° C. When the Li/Mg molar ratio is too high, the ratio of production of rubbery conjugated diene homopolymer rises and the yield of the block polymer of the present invention declines.

Further, at the same time as the organolithium compound added subsequently, with the object of enhancing the polymerization activity of the catalyst or enhancing the 1,2-vinyl units and further lowering the trans units, it is possible to use a Lewis base. As the Lewis base which can be suitably used, there are ethers, thioethers, and amines. As examples of the same, there are diethylether, tetrahydrofuran, triethylamine, N,N,N',N'-tetramethylethylenediamine, and oxolanylpropaneoligomers. The amount of the electron donor compound used differs depending on the strength of the Lewis base of the compound, but generally speaking, a compound with a strong basicity may be used in a smaller amount compared with a compound with a weak basicity. The preferable amount used is about 0.01 to 50 moles per mole of the organolithium compound. The polymerization is performed by a catalyst, to which has been added the above-mentioned organolithium, at a temperature of 30° to 200° C., more preferably 50° to 150° C. At this step, it is possible to introduce into the polymerization system a monomer to serve as the predetermined rubbery conjugated diene polymer block (B).

In this case, the residual butadiene unreacted at the step (2) and the monomer introduced at step (3) are polymerized at step (3). Therefore, the ratio in the block polymer of the resinous polybutadiene block and the rubbery conjugated diene polymer block may be freely controlled by the conversion at the step (2), the amount of residual butadiene unreacted at step (2) and the amount of monomer additionally introduced at step (3), which are polymerized at step (3), and the conversion at step (3). Note that it is desirable that the additional monomer have no substantial components which cause deactivation of the moisture and other catalysts and that it is desirable to introduce the additional monomer and the additional catalyst into the polymerization system mixed in advance.

In the steps (2) and (3) of the above production process, the production of the components other than the block polymer comprised of the resinous polybutadiene block (A) and the rubbery conjugated diene polymer block (B), that is, the resinous polybutadiene homopolymer and the rubbery conjugated diene polymer is governed by the catalyst composition and proportion of steps (2) and (3) and further by the presence of moisture.

That is, the ratio of the number of molecules of the total of the block polymer comprised of the high trans resinous polybutadiene block and the rubbery diene block and the high trans resinous polybutadiene homopolymer, and the low trans butadiene and other rubbery conjugated diene homopolymers is controlled by the catalyst composition and proportion of the steps (2) and (3), the ratio being preferably in the range of 1:99 to 85:15. Further, the weight ratio of the total of the block polymer comprised of the high trans resinous polybutadiene block and rubbery diene block and the high trans resinous polybutadiene homopolymers with the rubbery diene homopolymers can be freely controlled by the polymerization conditions, that is, the catalyst composition and proportion of steps (2) and (3), the conversion of step (2), the amount of the additional monomer of step (3), and the like.

In the above-mentioned production process, the amount of production of the high trans resinous polybutadiene homopolymer increases when the polymerization of step (2) is performed at over a predetermined temperature or there is the presence of moisture in the monomer added at the step (3).

In the above-mentioned production process, the molecular weight of the polymer can be controlled by adjusting the composition of the catalyst used, the temperature, etc. Further, the molecular weight distribution of the polymer can be controlled by adjusting the composition etc. of the catalyst used and the polymerization method. For example, with an ordinary batch polymerization, an $\overline{M}w/\overline{M}n$ of less than 2 can be easily obtained and with continuous polymerization, an $\overline{M}w/\overline{M}n$ of 2 or more can be easily obtained.

After the polymerization reaction reaches a predetermined conversion, a known termination agent is added to the reaction system and then the normal solvent removal and drying steps in the production of a conjugated diene polymer performed.

Further, by the known coupling reaction technology, for example, the method of adding, during or after the end of the polymerization, an ester compound, polyepoxy compound, halogenated hydrocarbon compound, halogenated silicon compound, halogenated tin compound, or other coupling agents using the reactive ends of living polymers or divinyl benzene or other polyfunctional monomers, etc., it becomes possible, when necessary, to give the polymer a branched structure or to enlarge the molecular weight distribution. By this method, it is possible to make a block polymer having in one molecule two or more resinous polybutadiene blocks. This polymer is a thermoplastic elastomer having resinous polybutadiene as hard segments.

As the coupling agent used in this method, use may be made of bifunctional, trifunctional, tetrafunctional, and higher polyfunctional compounds. With the reaction of a bifunctional coupling agent and living polymer chain, a high molecular linear polymer is obtained. With a trifunctional one or higher, a branched polymer is obtained. As the coupling agent used, there are, for example, dibutyl tin dichloride, dioctyl tin dichloride, diethyl silicon dichloride, dibutyl silicon dibromide, methylbenzoate, butyl tin trichloride, octyl tin trichloride, methyl silicon trichloride, ethyl silicon trichloride, butyl silicon tribromide, tin tetrachloride, lead tetrachloride, silicon tetrachloride, tetramethoxy tin, ethylene bistrichlorosilane, diethyl adipate, dimethyl carbonate, hydrocarbon compounds having two or more epoxy radicals or ester radicals in one molecule, for example, epoxylated soybean oil, liquid polybutadiene having two or more epoxy radicals in one molecule, hydrocarbon compounds having one or more diglycidylamino radicals in one molecule, for example, tetraglycidyl-1,3-bisaminomethylcyclohexane, tetraglycidyldiaminodiphenylmethane, etc. By using the coupling reaction, the resultant block polymer can be further prevented from cold flow and when used for rubber applications, the green strength of the unvulcanized product becomes extremely great and the processability during the rubber working is vastly improved. As a coupling agent particularly preferably used, there are tin tetrachloride, silicon tetrachloride, tetraglycidyldiaminodiphenylmethane and the like.

Further, it is also possible to use the known terminal modification technology, for example, the terminal modification technology based on the reaction of living polymer chains and trialkyl tin chloride, triaryl tin chloride, and other terminal modifying agents and similarly the reaction with compounds having the

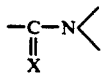

bonds, in the molecule (where X indicates an oxygen or sulfur atom), N,N-dialkylamino aromatic aldehyde compound, N,N-dialkylamino aromatic ketone compound, thiocarbonyl compound, dithiocarboxylic acid ester, isocyanate compound, thioisocyanate compound, carbonate compound, and other terminal modifying agents. The block polymers obtained by using these terminal modification technologies, for example, when made into vulcanized rubber, retain their wet skid resistance and also are improved in their rebound elasticity at high temperatures, are reduced in their heat build up, and otherwise improved and, together with the high wear resistance and tensile strength of the block polymer of the present invention, can be suitably used for fuel saving tires, all season tires, high performance tires, and other tread rubber uses. As the preferably used terminal modifying agents, mention may be made of tributyl tin chloride, triphenyl tin chloride, N,N,N',N'-tetramethyl urea, N-methyl-epsilon-caprolactam, N-methyl-2-pyrrlidone, N,N'-dimethylethylene urea, 4,4'-bis(diethylamino)benzophenon, phenylisothiocyanate, dicyclohexylcarbodiimide, etc.

Further, by using together with the above-mentioned coupling reaction and terminal modification technology, it is possible to obtain the effects of both.

The polymer obtained by the above-mentioned method is mostly the block polymer or polymer composition of the present invention. In particularly, when the block polymer itself is attempted to be obtained in a high purity, it is necessary to separate the mixed resinous polybutadiene homopolymer or rubbery conjugated diene polymer. These may be separated and refined by the usual separation method using the difference in solubilities, fractional precipitation, fractional dissolution, and other column chromatography methods using differences in adsorption, the gel permeation chromatography (GPC) method using the difference in molecular weight, and other methods.

In particular, when resinous butadiene homopolymers are present in the polymer obtained, the method is preferable of heating and dissolving the polymer in a mixed solvents of hexane and cyclohexane and then cooling and thereafter separating the resinous butadiene homopolymer as the precipitate by centrifugation. Alternatively, when rubbery conjugated diene polymer is mixed in, it is particularly desirable to use the GPC separation method.

The diene block polymer of the present invention can be measured in its glass transition temperature and crystalline melting point by DSC. Note that the crystalline melting point of diene block polymer is several degrees to (ten plus several) degrees centigrade lower than the crystalline melting point of the homopolymer obtained by sampling at the stage of polymerization of the resinous polybutadiene block (A) of the diene block polymer of the present invention.

The diene block polymer and polymer composition of the present invention have broad applications. For example, as effects of the present invention, there are an improved balance of the wet skid resistance and wear resistance and improved tensile strength and processability. From these features, they may be suitably used for vulcanized rubber applications, specifically tire treads, carcasses, sidewalls, and other tire applications or shock absorbing rubber, belts, and other auto parts, industrial parts, and other applications. Further, the cold flow is improved, the controllability of the particle diameter, the impact resistance, and the balance of the rigidity and gloss are excellent, and the low temperature impact resistance is improved. From these features, they may be suitably used as grafts or blends with various plastics such as polystyrene.

In particular, the block polymer and polymer composition of the present invention is superior in processability and excellent in tensile strength and wear resistance. Further, it is possible to provide a rubber composition having these plus the excellent features of a good balance with the wet skid resistance.

The rubber composition comprised of the block polymer and polymer composition of the present invention is a rubber composition containing 100 parts by weight of the block polymer, polymer composition, or raw rubber containing at least 20% by weight of the same, 10 to 300 parts by weight of carbon black, and 0.1 to 10 parts by weight of a vulcanizing agent.

In the above-mentioned rubber composition, the raw rubber is selected in accordance with the application and object of the rubber composition, but to make use of the workability, tensile strength, wear resistance, hardness, and other features of the block polymer and polymer composition of the present invention, it is required that the raw rubber contain at least 20% by weight of the above polymer, preferably 30% by weight. As other raw rubber used along with the polymer of the present invention, mention may be made of natural rubber, synthetic polyisoprene rubber, styrene-butadiene copolymer rubber obtained by the emulsion polymerization method, styrene-butadiene copolymer rubber obtained by the solution polymerization method, high cis polybutadiene rubber, low cis polybutadiene rubber, high vinyl polybutadiene rubber, polychloroprene rubber ethylene-propylene copolymer rubber, butyl rubber, halogenated butyl rubber, acrylonitrile-butadiene copolymer rubber, acryl rubber, etc. These raw rubbers may be used alone or in combination of two or more in accordance with need.

Next, in the above-mentioned rubber composition, use is made of 10 to 300 parts by weight of carbon black as a reinforcing material as against 100 parts by weight of raw rubber. When the amount of carbon black is less than 10 parts by weight, the tensile strength, wear resistance, and other reinforcing features are insufficient, while when over 300 parts by weight, the heat build-up, elongation, workability, etc. decline. The amount of carbon black is preferably 20 to 200 parts by weight. The type of carbon black used differs in the particle diameter, structure, aggregate distribution, etc. in accordance with the purpose of use of the rubber composition. Use is made of carbon black of the SAF, ISAF, HAF, FEF, GPF, SRF, FT, MT, and other classes. In particular, for tire tread applications where the demands on tensile strength and wear resistance are high, use is made of the SAF, ISAF, HAF, and other classes with small particle diameters and high reinforcing properties. On the other hand, for applications where heat build-up and permanent compression set are required, use is made of carbon black with relatively large particle diameters.

In the above-mentioned rubber composition, use is made of 0.1 to 10 parts by weight of vulcanizing agent with respect of 100 parts by weight of raw rubber. The most representative vulcanizing agent is sulfur. In addition, use may be made of thiuram compounds and other sulfur-donor compounds, phenol resins, and peroxides as the vulcanizing agents.

Further, in the above-mentioned rubber composition, in accordance with need, use is made of 1 to 200 parts by weight, per 100 parts by weight of the raw rubber, of a rubber extender. Rubber extender oil is added in that it improves the workability of the rubber composition and improves the dispersion of the carbon black. Further, it may be used together with the carbon black to adjust the hardness of the resultant rubber composition. The rubber extender is selected in accordance with the purpose of use of the rubber composition. In applications where emphasis is on strength and processability, it is preferable to use rubber extender of the aromatic type. In applications where low temperature performance and heat build-up are stressed, naphthene type and paraffin type rubber extenders are suitable. Further, use may be made of various fatty acid ester types.

In the above-mentioned rubber composition, in accordance with need, various rubber chemicals may be added. As the rubber chemicals, use may be made of stearic acid, zinc oxide, and other co-vulcanizing agents, sulfenamide, thiazol, guarnidine, thiuram, and other vulcanizing accelerators, amine and phenol aging preventatives, and various other rubber chemicals.

The features of the rubber composition of the present invention are described below.

The polymer of the present invention, i.e., the diene block polymer or polymer composition, as mentioned earlier, when formulated and vulcanized by itself, becomes a rubber composition which exhibits excellent tensile strength, tearing strength, cut growth resistance, and other mechanical strengths, high hardness, wear resistance, balance of wear resistance and wet skid resistance, heat build-up, resilience, and other physical properties and has excellent mill behavior, extrudability, and other processability features. Further, when used together with other raw rubbers, the features of the other raw rubbers are not significantly impaired and the strength, wear resistance, and workability of the resultant rubber composition can be improved.

For example, in a rubber composition consisting of a blend with natural rubber, the tensile strength and cut growth resistance, which proved to be problems in past blends of natural rubber and polybutadiene, can be vastly improved and the wear resistance of rubber composition of natural rubber alone can be improved on. The result is a rubber composition with a wide range of applications and superior performance compared with the natural rubber and polybutadiene blends which have been so often used in the past for treads and sidewalls of various tires. Further, rubber compositions comprised of the polymer of the present invention and styrene-butadiene copolymer as raw rubber, compared with the conventional styrene-butadiene copolymer rubber alone or blends of styrene-butadiene copolymer rubber and polybutadiene rubber, are free from loss of the features important for tire treads, i.e., wet skid performance and low fuel consumption performance, and are improved in wear resistance, so are suitable rubber compositions for treads of low fuel consumption tires, all season tires, high performance tires, and other passenger car tires.

Further, the polymer of the present invention has crystalline components. The hardness of the components is used to give a rubber composition with a higher hardness compared with conventional rubber compositions. With the polymer alone or in blends with other raw rubbers, the hardness is a high 75 or more by JIS(A). Also, an excellent heat build-up can be obtained. These make the rubber composition usable for applications such as the bead filter portions of tires, high hardness shock absorbing rubber, and high hardness industrial parts.

Further, the polymer of the present invention can be combined with other raw rubbers with undesirable workabilities so as to improve the workabilities of the other raw rubbers. As such raw rubbers, mention may be made of polybutadiene rubber, polychloroprene rubber, acrylonitrile-butadiene copolymer rubber, etc. In the case where the desire is to improve the workability of the same, the ratio of the polymer of the present invention in the raw rubbers preferably a relatively small amount, for example, 10 to 25 parts by weight, in view of the balance of the physical properties and processability.

The rubber composition of the present invention, together with the raw rubber and other agents, is kneaded by an internal mixer, rubber kneading roll, extruder, or other rubber kneader, shaped and assembled in accordance with its application, then vulcanized by a vulcanizing press, vulcanizing vessel, or other usual vulcanizing apparatus at a temperature of 130° to 200° C. and then supplied for use.

The polymer of the present invention, i.e., the diene block polymer and polymer composition, may be used as a toughening agent for high impact polystyrene resins. The high impact polystyrene resin is obtained by subjecting 2 to 20% by weight of the polymer of the present invention and 98 to 80% by weight of styrene monomer alone or a mixture of styrene monomer and copolymerizable unsaturated compounds to bulk polymerization, bulk suspension polymerization, or solution polymerization for radial polymerization. The resultant resin has extremely advanced features, i.e., high impact strength and rigidity and a high degree of balance of these with the external appearance. Further, it features improved impact strength at low temperatures, specifically, $-30°$ C.

The polymer of the present invention used as the above-mentioned toughening agent is a butadiene polymer including a block polymer comprised of a butadiene polymer block having 60% or more trans bonds and a butadiene polymer block having less than 60% trans bonds. Particularly preferable is a butadiene polymer having as its main components a block polymer comprised of a resinous polybutadiene block having a glass transition temperature of $-80°$ C. or less, a crystalline melting point of 30° to 130° C., 80% or more trans units, and a molecular weight of 10,000 to 200,000 and a rubbery polybutadiene block having a glass transition temperature of $-70°$ C. or less, having no crystalline melting point, and having 60% or less trans units and a molecular weight of 20,000 to 400,000 and a rubbery polybutadiene having a glass transition temperature of $-70°$ C. or less, having no crystalline melting point, and having 60% of less trans bonds and a molecular weight of 20,000 to 400,000. In this case, the glass transition temperature of the polymer comprising the high trans resinous block is preferably $-80°$ C. or less, more preferably $-85°$ C. or less. When the glass transition temperature exceeds this, the impact strength is insufficient.

The ML viscosity (measured at 100° C. using L rotor) of the butadiene block polymer and butadiene polymer composition of the present invention in this application is 10 to 150, preferably 15 to 120, more preferably 20 to 100.

Further, the viscosity in 5% styrene solution at 25° C. is 10 to 400 centipoise, preferably 15 to 300 centipoise, more preferably 20 to 200 centipoise. A polymer outside of that range, when used as rubber for this application, is very difficult of handle and thus is not preferable.

In the present invention, in addition to the butadiene polymer and the polymer composition of the present invention, it is possible to use another known unvulcanized rubber as a toughening agent in a small amount for example, 1 to 10% by weight. In this case, to achieve the effects of the present invention, it is necessary that at least 30% by weight of the toughening agent used by the polymer of the present invention.

The high impact polystyrene resin of the present invention can be obtained also by mechanical mixture of the polybutadiene polymer or polymer composition of the present invention with a polystyrene resin, but the most suitable method for obtaining the high impact polystyrene resin of the present invention is to subject 2 to 20% by weight of the polybutadiene polymer or polymer composition of the present invention and 98 to 80% by weight of styrene monomer or a mixture of a styrene monomer and a copolymerizable unsaturated compound to bulk polymerization, bulk suspension polymerization, or solution polymerization for radical polymerization.

As the styrene monomer used in the present invention, mention may be made of styrene, alpha-methylstyrene, vinyltoluene, vinylethylbenzene, vinylxylene, vinylnaphthalene, etc. used alone or as mixtures of two or more. Further, as the unsaturated compound copolymerizable with styrene monomers, mention may be made of acrylonitrile, methylmethacrylate, etc. The styrene monomer particular preferable in the present invention is styrene. This may be used alone or as a mixture with other monomers, in which case the ratio of the styrene in the mixture is 50% by weight or more.

One of the preferable methods for obtaining the high impact polystyrene resin of the present invention, i.e., bulk polymerization, is performed in general as follows. First, the butadiene polymer or polymer composition specified in the present invention is dissolved in styrene. In the case of no catalyst where no use is made of a radical initiator, this is then heated and polymerized at a polymerization temperature of 50° to 250° C. In the case of use of a radical initiator as a catalyst, polymerization is performed at 20° to 200° C. in accordance with the decomposition temperature of the radical initiator and the polymerization procedure continued until the reaction rate of the styrene reaches the desired value. In this bulk polymerization, often a known internal lubricant, for example, liquid paraffin, is added in amounts of 0.1 to 5 parts by weight to 100 parts by weight of the polymer. After the completion of the polymerization, when a small amount, usually less than 30% by weight, of unreacted styrene remains in the produced polymer, the styrene in question is preferably removed by a known method, e.g., removal under reduced pressure and heating or removal by an extrusion apparatus designed with the aim of removal of the volatile fraction. Agitation is preformed during the bulk polymerization in accordance with need, but after the conversion of the styrene to a polymer, i.e., the styrene polymerization rate, reaches 30% or more, it is desirable to stop the agitation or else moderate it. Excessive agitation may lower the strength of the resultant polymer. Further, if necessary, the polymerization may be performed in the presence of a small amount of toluene, ethylbenzene, or other dilution solvent and, after the completion of the polymerization, the dilution solvent may be removed by heating together with the unreacted styrene.

Bulk suspension polymerization is also useful for the production of the high impact polystyrene resin of the present invention. This method has the first half of the reaction performed in bulk and the second half of the reaction performed in suspension. That is, the styrene solution of the specified butadiene polymer or polymer composition of the present invention is subjected to heating and polymerization without a catalyst or polymerization with the addition of a catalyst in the same way as the previous bulk polymerization or else irradiation polymerization for partial polymerization up to normally 50% or less of the styrene, particularly preferably 10 to 40%. This is the first half bulk polymerization. Next, the partially polymerized mixture is dispersed with agitation in an aqueous medium under the presence of a suspension stabilizer or the same and a surface active agent and then the latter half of the reaction completed by suspension polymerization. In the same way as the above bulk polymerization, the product is then washed, dried, and if necessary, pelletized or powderized for supply for practical use.

In addition to the above, a useful high impact polystyrene resin can be obtained by conventional, known methods modified or improved by these methods.

The high impact polystyrene resin of the present invention thus obtained is comprised of a hard phase and soft phase of the styrene polymer, that is, a butadiene polymer or polymer composition graft copolymerized with styrene etc. and dispersed particles of styrene polymer sealed by the same.

The high impact polystyrene resin of the present invention preferably has soft component particles of a diameter (measured by electron micrographs) of 0.1 to 10 microns, expressed in terms of average values. Particularly preferable is a range of 0.3 to 5 microns. The particle diameter can be controlled principally by the agitation conditions in the above-mentioned production process. Further, the gel fraction, which has a correlation to the weight of the soft component in the resin and is measured as the toluene insoluble fraction, is preferably 2 to 6 times the weight of the polybutadiene rubber used. Particularly, preferable is a range of 3 to 5 times. Further, the gel swelling index (details provided in Japanese Examined Patent Publication (Kokoku) No. 55-30525), which bears correlation to the ratio of the styrene polymer sealed in the soft component, is preferably 5 to 20. More preferably is a range of 8 to 15. The gel fraction and gel swelling index can be controlled by the polymerization temperature in the production process, particularly the polymerization temperature in the latter half of the process, and the addition of catalyst for promoting the cross-linking, for example, various types of peroxides. The performance of the high impact polystyrene resin can also be changed by the particle diameter of the above-mentioned soft component, gel fraction, and gel swelling index. However, the changes in the performance of the high impact polystyrene resin by these factors, in general, are in inverse relation, for example, if the impact strength is improved, the rigidity declines or if the external appearance is improved, the impact strength declines. Various proposals have been made to improve the relationship, but in so far as the rubber used for this application has been used as a toughening agent, the results have been insufficient. The present invention improves this inverse relationship. The high impact polystyrene resin of the present invention uses butadiene polymer or polymer composition with an extremely excellent cold flow and thus is extremely superior in practical impact strength at low temperature, specifically $-30°$ C., compared with conventional styrene or high impact polystyrene resin having styrene as its principal component and is far more superior compared with conventional resins in terms of the balance of the same with the rigidity, tensile strength, elongation, etc. Further, when the relative particle size is made small, the external appearance is also superior. Still further, the productivity is sufficient and thus the industrial significance of the present invention is extremely great.

The high impact polystyrene resin of the present invention may be used to create various useful products by injection molding, extrusion, and other processing methods. During the processing, when necessary, it may be mixed with flame retardants, antioxidants, ultraviolet absorbers, lubricants, mold separators, fillers, etc. and further with other thermoplastic resins, for example, general purpose polystyrene (GPPS), methacrylic resins, etc. The effects of the present invention are also largely exhibited when imparting flame retardance by addition of a flame retardant.

EXAMPLES

The present invention will now be further illustrated by, but is by no means limited to, the following Examples.

Note that the microstructures of the polybutadiene are analyzed by the Morero method using a carbon disulfide solution and an infrared spectrophotometer (Nihon Bunko Model A-202), and the butadiene-styrene copolymer is calculated by the Hampton method.

Further, the molecular weight is measured using GPC (Shimadzu Seisakusho, LC-5A, columns: one each HSG40, 50, and 60, column temperature: 40° C., solvent: tetrahydrofuran, detector: Differential refractometer), using a calibration curve found in advance from the relationship of the molecular weights of the peaks of standard polystyrene with the GPC count, and finding the average molecular weight of the polybutadiene by the ordinary method.

The glass transition temperature and crystalline melting point are measured by DSC (Seiko Denshi Model DSC-20, speed of temperature rise: 10° C./min). For the glass transition temperature, use it made of the starting point and for the crystalline melting point, the peak temperature (middle point).

The assay of the high trans resinous polybutadiene homopolymer is performed by dissolving the polymer in a mixed solvent of n-hexane and cyclohexane, then cooling the same to 0° C., centrifuging the deposited precipitate, and weighing the crystals.

EXAMPLE GROUP I

Example I-1

Using a 10 liter capacity stainless steel reactor equipped with an agitator and jacket, 0.75 kg of 1,3-butadiene, 4.25 kg of cyclohexane, and a catalyst were charged in and subjected to batch polymerization. The catalyst consisted of 0.058 mmole of lanthanum varsaticate 0.30 mmole of dibutyl magnesium, and 0.12 mmole of n-butyl lithium per 100 g of monomer and the reaction was proceeded with for at 68° C. for one hour. The conversion was measured by sampling and found to be 38%. The microstructure of the polymer was 87% trans, 5% vinyl, and 8% cis. The glass transition temperature by DSC was $-88°$ C., the crystalline melting point was $+85°$ C., the molecular weight $\overline{M}w$ by GPC was 92,000, the molecular weight distribution $\overline{M}w/\overline{M}n$ was 1.2, and the GPC chart was a sharp single peak.

A DSC chart of the polymer is shown in FIG. 1.

To the above-mentioned polybutadiene solution is added additional n-butyl lithium in an amount of 0.48 mmole per 100 g of the initial feed monomer. The internal temperature was raised to 115° C. and the polymerization performed for 1.5 hours. After this, 0.6 phr of 2,4-ditertiary butyl-p-cresol (parts per weight per 100 parts of rubber) was added and mixed and the result introduced into hot water for steam stripping and removal of the solvent. The resultant rubber was dried by hot rolls. This was used as sample I-A.

The final conversion of the polymerization was measured and found to be 97%. The microstructure of the polymer was 65% trans, 10% vinyl, and 25% cis, the molecular weight $\overline{M}w$ by GPC was 145,000, the molecular weight distribution $\overline{M}w/\overline{M}n$ was 1.4, and the GPC chart was two peaks with a peak formed by the block polymer (72% by weight of the whole) and a broad peak on the low molecular weight side (28% by weight of the whole). Calculated from the conversion, the resinous polybutadiene portion accounted for 39% by weight of the whole and the rubbery polybutadiene portion for 61% by weight of the whole. The microstructure of the rubbery polybutadiene portion was calculated to be 51% trans, 13% vinyl, and 36% cis.

Figure 2:
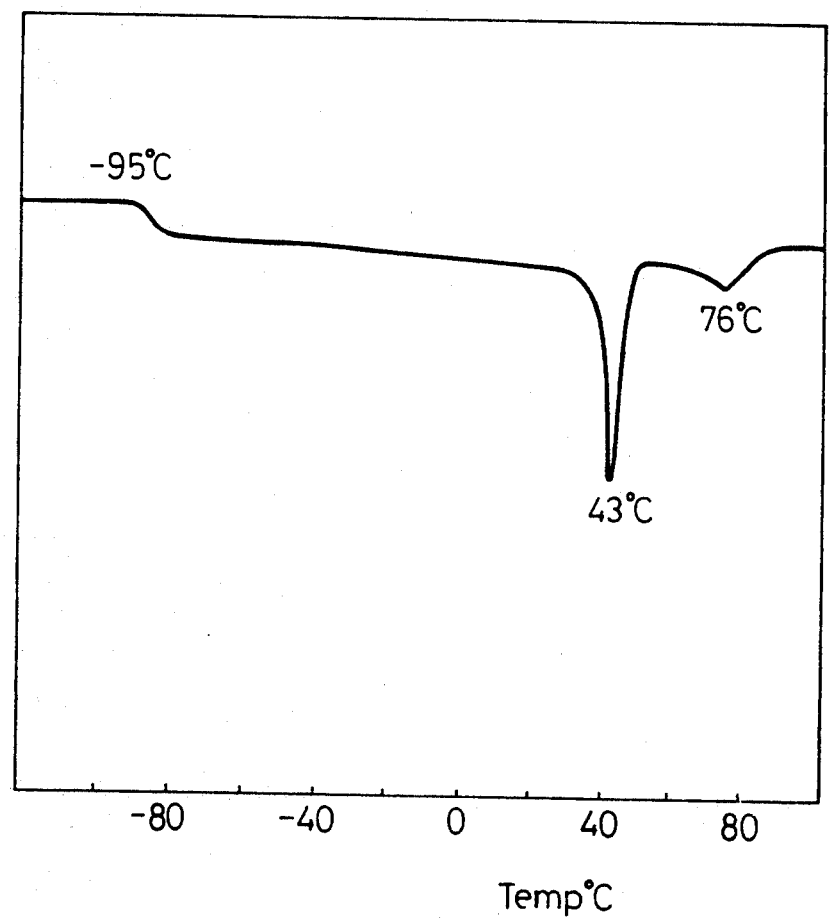
FIG. 2 is a DSC chart of a sample I-A.

A DSC chart of the sample I-A is given in FIG. 2. From this chart, it can be observed that the glass transition temperature is $-95°$ C. and the crystalline melting point is 76° C.

Two grams of the resultant polymer were heated and dissolved in 100 ml of a mixed solvent of n-hexane and cyclohexane. This was cooled to 0° C. and then the resinous polybutadiene homopolymer was separated, whereupon it was found that no precipitate was produced and that no resinous polybutadiene homopolymer was produced.

That is, the polymer was a mixture of 72% by weight of a diene block polymer of the present invention and 28% by weight of a rubber polymer not forming a block polymer. The weight ratio of the resinous polybutadiene block (A): rubbery conjugated diene block (B) in the diene block polymer was calculated to be 54:46.

The low molecular weight component was removed and refined by GPC. The GPC conditions were a column of 20 mm diameter and 1 m length (filler of HSG50), a flow rate of 5 ml/min, and a sample amount of 10 mg/test. The test was performed 240 times and 1.1 g of polymer with the low molecular weight side component was obtained (used as sample I-B). The sample I-B had a molecular weight $\overline{M}w$ by GPC of 170,000, a molecular weight distribution $\overline{M}w/\overline{M}n$ of 1.2, and a GPC graph of a sharp single peak.

The microstructure of the sample I-B was 70% trans, 9% vinyl, and 21% cis.

Figure 3:
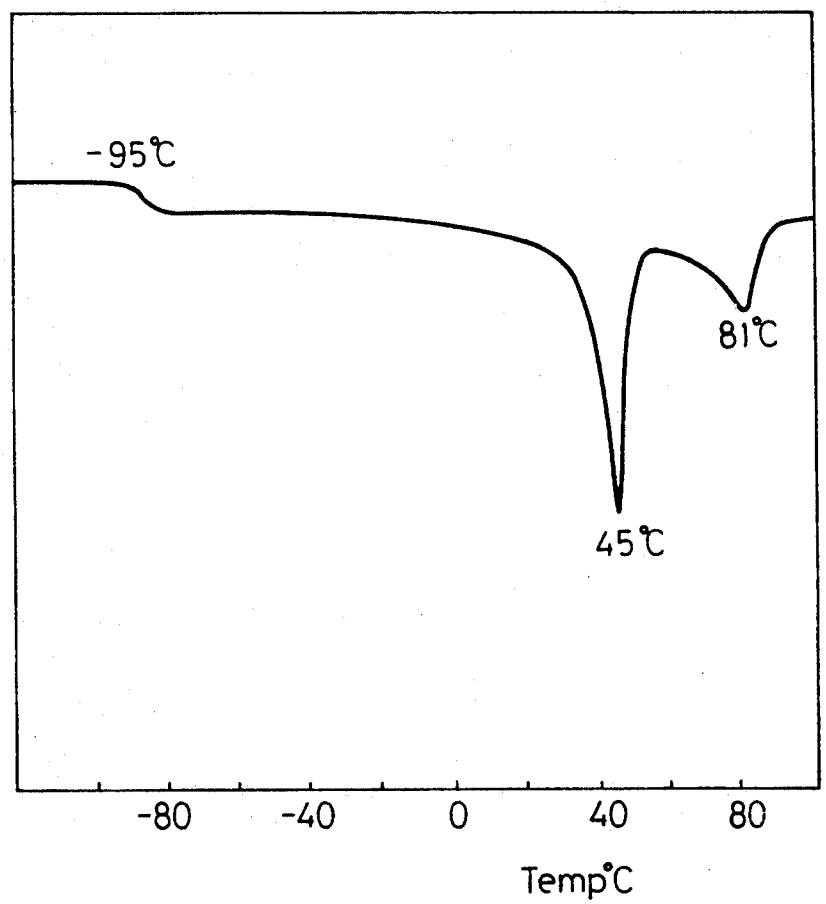
FIG. 3 is a DSC chart of a sample I-B.

The DSC chart of the sample I-B is shown in FIG. 3. From this chart, it is observed that the glass transition temperature was −95° C. and the crystalline melting point was 81° C.

The samples I-A and I-B were evaluated in terms of their cold flow.

The method of evaluation was to form the samples into cylinders of a diameter of 1 cm and a height of 1 m, place on top thereof a 20 g weight, let stand for one day in a constant temperature chamber of 50° C., perform an acceleration test, and observe the changes. Five rankings were given, with 5 for no change at all and 1 for crushing.

The result was rank 3 for the sample I-A and rank 5 for the sample I-B.

Using sample I-A, the formulation of Table I-2 was prepared and vulcanized by an ordinary method using a 3-inch open roll and the physical properties were evaluated. The results are shown in Table I-1.

The physical properties were evaluated by the following methods:

(1) Hardness and tensile strength: According to JIS-K-6301. The tensile test pieces were 2 mm in thickness. Use was made of a JIS No. 3 dumbbell.

(2) Impact resilience: Use was made of a Dunlop tripsumeter. The test pieces used were two sheets of 2 mm thickness superposed.

Example I-2

Using a 10 liter capacity stainless steel reactor equipped with an agitator and jacket, 0.616 kg of 1,3-butadiene, 2.464 kg of cyclohexane, and a catalyst were charged in and subjected to batch polymerization. The catalyst consisted of 0.075 mmole of lanthanum versaticate. 0.40 mmole of dibutyl magnesium, and 0.15 mmole of n-butyl lithium per 100 g of monomer and the reaction was proceeded with for at 65° C. for 1.5 hours. The conversion was measured by sampling and found to be 43%. The microstructure of the polymer was 9% trans, 4% vinyl, and 7% cis. The glass transition temperature by DSC was −87° C., the crystalline melting point was +95° C., the molecular weight $\overline{M}w$ by GPC was 67,000, the molecular weight distribution $\overline{M}w/\overline{M}n$ was 1.2, and the GPC graph was a sharp single peak. To the high trans polybutadiene solution was added additional 0.205 kg of 1,3-butadiene, 0.116 kg of styrene, 1.284 Kg of cyclohexane, 0.287 Kg of n-butyl lithium, and 1.0 g of tetramethylethylenediamine. The internal temperature was raised to 100° C. and the polymerization performed, then after 10 minutes a mixture of 0.183 kg of 1,3-butadiene and 0.732 kg of cyclohexane was continuously added over 45 minutes. After this, the same treatment was applied as in Example I-1 to obtain the polymer. This was used as sample I-C.

The final conversion of the polymerization was measured and found to be 97% of the butadiene and 94% of the styrene. The bound styrene content of the polymer was 10% by weight, and the microstructure of the polymer was 50% trans, 29% vinyl, and 21% cis. The isolated styrene by the ozone decomposition-GPC method was 65% by weight with respect to the entire bound styrene, and the long chain block styrene was 0.5% by weight with respect to the total bound styrene. The result was a completely random copolymer. The molecular weight $\overline{M}w$ by GPC was 170,000, the molecular weight distribution $\overline{M}w/\overline{M}n$ was 1.6, and the GPC was a two peak form with a peak formed by the block polymer (69% by weight of the whole) and a somewhat broad peak on the low molecular weight side (31% by weight of the whole). Calculated from the conversion, the resinous high trans polybutadiene accounted for 24.5% by weight of the whole. The microstructure of the rubbery butadiene-styrene copolymer portion was calculated to be 37% trans, 37% vinyl, and 26% cis and the bound styrene 13% by weight.

Fractionization was performed b the same method as in Example I-1 and the resinous polybutadiene polymer was measured, wherein it was found that no precipitate was produced and that no resinous polybutadiene homopolymer was produced.

That is, the polymer was a mixture of 69% by weight of a diene block polymer of the present invention and 31% by weight of a rubber polymer not forming a block polymer. The weight ratio of the resinous polybutadiene block (A): conjugated diene rubber block (B) in the diene block polymer was calculated to be 35.5:64.5.

The sample I-C was evaluated in the same way as Example I-1. The results are shown in Table I-1.

Example 3

The two stage polymerization was performed in the same way as in Example I-1, then 2.93 g of tributyl tin chloride was added and the mixture agitated for 15 minutes for the reaction. After this, the same treatment was applied as in Example I-1 to obtain the polymer. This was used as sample I-D.

The same evaluation was performed as in Example I-1. The results are shown in Table I-1.

Comparative Example I-1 (Sample I-E)

In the same way as Example I-1, batch polymerization was performed for one hour, then stopped and sampling performed to obtain a high trans resinous polybutadiene homopolymer (sample I-E-1).

Using n-butyl lithium, there was obtained usual polybutadiene (Mw of 200,000, $\overline{M}w/\overline{M}n$ of 1.1, 52% trans, 13% vinyl, and 35% cis) (sample I-E-2).

39 parts by weight of sample I-E-1 and 61 parts by weight of sample I-E-2 were mixed at 120° C. by a hot roll to make sample I-E.

Sample I-E had two peaks of molecular weight distribution by GPC. In the same way as in Example I-1, fractionization was performed from the mixed solvent of n-hexane and cyclohexane, whereupon the resultant sediment was found to be 35% by weight with respect to the sample I-E.

Evaluation was performed in the same way as Example I-1. The results are shown in Table I-1.

Comparative Example I-2 (Samole I-F)

In the same way as in Example I-2, batch polymerization was performed for 1.5 hours, then stopped and sampling performed to obtain a high trans resin polybutadiene homopolymer (sample I-F-1).

Using n-butyl lithium and tetramethyl ethylene diamine, there was obtained a usual butadiene-styrene random copolymer ($\overline{M}w$ of 180,000, $\overline{M}w/\overline{M}n$ of 1.2, bound styrene of 13% by weight, block styrene of 0%, 37% trans, 37% vinyl, and 26% cis) (sample I-F-2).

Twenty-four point five parts by weight of sample I-F-1 and 75.5 parts by weight of sample I-F-2 were mixed at 120° C. by a hot roll to make sample I-F.

Sample I-E had two peaks of molecular weight distribution by GPC. In the same way as in Example I-1, separation was performed, whereupon the resultant sediment was found to be 22% by weight with respect to the sample I-F.

Evaluation was performed in the same way as Example I-1. The results are shown in Table I-1.

Comparative Example I-3 (Sample I-G)

Into a 5 liter reactor equipped with an agitator and jacket were introduced 945 g of a cyclohexane mixture containing 161 g of 1,3-butadiene and 28 g of styrene, then a Ba-Mg-Al initiator (Ba/Mg/Al=0.18/0.57/0.04 unit mmole/100 g monomer, described in U.S. Pat. No. 4,297,240) was added and polymerization performed at 60° C. for 5 hours. Part of this was sampled, then 1155 g of cyclohexane mixture containing 231 g of 1,3-butadiene and a cyclohexane solution of Na tertiary amylate and TMEDA (Na/Mg molar ratio=0.77 TMEDA/Mg molar ratio of 0.61) were added and the polymerization performed at 50° C. for one hour. After this, methanol was added to stop the reaction, then the same procedure as in Example I-1 was followed and the polymer obtained. The resultant polymer was used as sample I-G.

The polymer sampled midway had a trans content of 76%, a bound styrene of 5% by weight, and an $\overline{Mw}$ of 21,000. The sample I-G had a trans content of 40%, a vinyl content of 43%, a bound styrene of 5% by weight, an $\overline{Mw}$ of 70,000, and an $\overline{Mw}/\overline{Mn}$ of 3.5.

Using sample I-G, the same evaluation as in Example I-1 was performed. The results are shown in Table I-1.

Comparative Example I-4 (Sample I-H)

Using a 10 liter internal capacity stainless steel reactor equipped with an agitator and jacket, 1.0 kg of 1,3-butadiene and, as a solvent, 4.0 kg of n-hexane were charged. This was heated to 85° C., a catalyst added, and polymerization performed. The catalyst used was, per 100 g of monomer, 0.22 mmole of barium dinonyl phenoxide, 0.33 mmole of lithium-magnesium tributyl, and 0.44 mmole of triethyl aluminum. The reaction was proceeded with for 1.5 hours. After this, the same treatment was applied as in Example I-1 to obtain a rubber polybutadiene. This was used as sample I-H.

The sample I-H had a molecular weight $\overline{Mw}$ by GPC of 170,000, a molecular weight distribution $\overline{Mw}/\overline{Mn}$ of 1.3 and a GPC of a sharp single peak. The microstructure was 71% trans, 7% vinyl, and 22% cis.

The same evaluation was performed as in Example I-1. The results are shown in Table I-1.

Comparative Example 5 (Sample I-I)

This was a commercially available polybutadiene. Diene 35 made by Asahi Kasei Co. was evaluated in the same way as in Example I-1. The results are shown in Table I-1.

From the results of Table I-1, it is learned that the samples I-A, I-C, and I-D, which were examples including the block polymer of the present invention, exhibited superior cold flow, mill behavior, tensile strength, and resilience compared with samples I-E to I-I of the comparative examples.

In particular, in a comparison of the sample I-A, which includes the block polymer of the present invention, the sample I-E, which is a comparative example and a blend polymer of the same composition, and the sample I-H, which is another comparative example and is a rubber trans polybutadiene homopolymer, it is clear that the block polymer of the present invention gives extremely superior effects in terms of the tensile strength, resilience and other performance features.

As clear from the above, the diene block polymer of the present invention, when used singly or as a blend, gives a vulcanized rubber which is superior in cold flow, excellent in mill behavior, and extremely excellent in tensile strength, resilience, and other performance features and is a suitable material for various applications. It may be said to be extremely great in industrial significance.

TABLE I-1

| | Sample | | | | | | | |
|---|---|---|---|---|---|---|---|---|
| | I-A | I-C | I-D | I-E | I-F | I-G | I-H | I-I |
| Cold flow | 3 | 3 | 3 | 2 | 2 | 2 | 1 | 1 |
| Mill behavior* | ⊚ | ⊚ | ⊚ | ○ | ○ | ○ | Δ | Δ |
| Hardness (JIS-A) | 69 | 67 | 68 | 70 | 69 | 60 | 66 | 65 |
| 300% modulus (kg/cm$^2$) | 85 | 80 | 95 | 95 | 88 | 75 | 67 | 70 |
| Tensile strength (kg/cm$^2$) | 215 | 235 | 220 | 170 | 185 | 137 | 195 | 150 |
| Elongation (%) | 515 | 520 | 500 | 400 | 430 | 450 | 500 | 480 |
| Impact resilience (room temperature) | 59 | 57 | 61 | 54 | 52 | 52 | 56 | 56 |

*⊚ excellent
○ good
Δ fair
x poor

TABLE I-2

| Formulation | Parts by weight |
|---|---|
| Raw rubber | 100 |
| Aromatic oil *1 | 10 |
| N-399 carbon black *2 | 50 |
| Stearic acid | 2.1 |
| Zinc oxide | 5.2 |
| Accelerator CZ *3 | 1.1 |
| Sulfur | 1.8 |

*1 Kyodo Sekiyu Co. X-140
*2 Iodine adsorption (IA) 90 mg/g Dibutylphthalate adsorption (DBP) 199 ml/100 g
*3 N-cyclohexyl-2-benzothiazylsulfenamide
Vulcanization conditions: 160° C. × 20 minutes

EXAMPLE GROUP II

Example II-1

Two 10 liter internal capacity, stainless steel reactors with a ratio of height to diameter (L/D) of 4 and equipped with agitators and jackets were connected in series. From the bottom of the first reactor was continuously fed an n-hexane solution of 1,3-butadiene and, as a catalyst, lanthanum varsaticate, dibutyl magnesium, and butyl lithium. The internal temperature was maintained at 75° C. and the polymerization performed. The concentration of the monomer mixture was 18% by weight and the feed rate of the monomer was 0.67 kg/hr. The amount of feed of the catalyst was 0.15 mmole of lanthanum varsaticate, 0.75 mmole of dibutyl magnesium, and 0.10 mmole of n-butyl lithium per 100 g of monomer.

Sampling was performed from the outlet of the first reactor and the conversion measured and found to be 60.2%. The microstructure of the resultant polymer was 86% trans, 6% vinyl, and 8% cis. The glass transition temperature by DSC was −85° C., the crystalline melting point was +82° C., he molecular weight $\overline{Mw}$ by GPC was 105,000, the $\overline{Mn}$ was 45,000, the molecular weight distribution $\overline{Mw}/\overline{Mn}$ was 2.3, and the GPC graph was a smooth single peak.

The polymer solution from the first reactor was introduced into the second reactor. Additional n-hexane solution of 1,3-butadiene and n-butyl lithium were introduced from the bottom of the second reactor. The concentration of the monomer mixture introduced to the second reactor was 18% by weight and the feed rate of the monomer was 0.67 kg/hr. The amount of the n-butyl lithium introduced into the second reactor was 1.79 mmole per 100 g monomer introduced into the second reactor. The internal temperature of the second reactor was maintained at 120° C. for the polymerization, then the polymer solution from the second reactor was continuously mixed with 0.6 phr of 2,4-ditertiary butyl-p-cresol (parts by weight per 100 parts of rubber). This was introduced into hot water for steam stripping and the solvent removed. The resultant rubber was dried by a hot roll. This was used as sample II-A.

The conversion at the second reactor outlet was 99.9% of the entire fed monomer. The microstructure of the resultant rubber was 61% trans, 11% vinyl, and 28% cis. The Mooney viscosity $ML_{1+4}$ (100° C.) was 34, the average molecular weight $\overline{M}w$ by GPC was 170,000, the $\overline{M}n$ was 79,000, the molecular weight distribution $\overline{M}w/\overline{M}n$ was 2.2, and the GPC graph was a broad single peak.

From the above results, the 86% trans resinous polybutadiene portion polymerized at the first reactor was 30% by weight of the total polymer obtained, the low trans rubbery polybutadiene portion polymerized at the second reactor was 70% by weight, and the microstructure of the low trans rubbery polybutadiene polymerized at the second reactor was 50% trans, 13% vinyl, and 37% cis.

Two grams of the resultant polymer was heated and dissolved in 100 ml of a mixed solvent of n-hexane and cyclohexane, then this was cooled to 0° C. and centrifuged while held at 0° C. and the precipitate and solution separated. The resultant precipitate was vacuum dried and then weighed, whereupon it was found that it was 0.5% by weight of the polymer. In other words, the high trans resinous polybutadiene homopolymer was 1.7% by weight, extremely low of the polymer of the first reactor (total of the high trans resinous polybutadiene block portion in block polymer and high trans resinous polybutadiene homopolymer).

By way of reference, the high trans resinous polybutadiene homopolymer sampled from the first reactor and the low trans rubbery polybutadiene polymerized by n-butyl lithium alone ($\overline{M}w$ of 100,000, $\overline{M}w/\overline{M}n$ of 2.4, microstructure of 52% trans, 13% vinyl, and 35% cis) were blended 50:50 and fractionization performed separately whereupon the resultant precipitate was 44% by weight of the blend polymer.

From the above results, it is discovered that the polymer II-A is a polymer composition having as principal components a block polymer comprised of a high trans resinous polybutadiene block and a low trans rubbery polybutadiene block and a low trans rubber polybutadiene homopolymer.

The cold flow of the resultant polymer was measured, whereupon it was found that there was substantially no cold flow.

Sample II-A: No cold flow even after three days

Diene 35 (commercially available product): Collapse after half day (a rectangular parallel piped rubber sample of 3 cm×3 cm×10 cm (height) was fixed to a 30 degree slanted base and the slanting state observed.)

The obtained polymer was mixed by the formulation of Table II-3, vulcanized, and the physical properties measured. The results are shown in Table II-4.

The method of evaluation entails obtaining the formulation by the method B of the standard formulation and mixture procedure of ASTM-D-3403-75 using a pressurized kneader with an internal capacity of 300 cc, vulcanizing the same, then measuring the physical properties. The measurement was performed by the following methods:

(1) Hardness and tensile strength: According to JIS-K-6301.

(2) Resilience: Lupke method according to JIS-K-6301.

However, the resilience at 70° C. is measured by preheating the sample in a 70° C. oven for one hour, then quickly taking it out.

(3) Goodrich heat build-up

Use was made of a Goodrich flexometer and the test run with an applied load of 24 pounds, a displacement of 0.225 inch, a starting temperature of 50° C., and a speed of 1800 rpm. The difference in the rise in temperature after 20 minutes was shown.

(4) Wet skid resistance

Use was made of a Stanley London portable skid tester. As the road surface, use was made of a safety walk (made by 3M). Measurement was by the method of ASTM-E-808-74.

(5) Wear resistance

Use was made of a Pico wear tester for the evaluation and the results shown by an index. The larger the value, the better.

(6) Cut resistance

A vulcanized rubber sample of a thickness of 5 mm was placed horizontally. Over this was placed a knife with an end of 1 mm×10 mm and an angle of 30 degrees. On the knife was naturally dropped a 500 g weight. The height at which the knife first cut through the rubber was read and used for the measurement. This was shown in ranks of 1 to 5, with the higher value indicating better cut resistance.

Example II-2

The same procedure as in Example II-1 was performed. However, the concentration of the monomer mixture introduced into the second reactor was 21% by weight, the feed rate of the monomer was 2.68 kg/hr, and the amount of the n-butyl lithium was 1.25 mmole per 100 g of the monomer introduced into the second reactor. Further, 350 ppm of 1,2-butadiene per monomer was added as a gelation prevention agent and the polymerization was performed with the internal temperature of the second reactor held to 127° C. This was used as sample II-B. The results of analysis are shown in Table II-1.

A cold flow test was performed in the same way as Example II-1, whereupon it was found that there was no cold flow even after three days. The resultant polymer (polymer composition) was evaluated in the same way as Example II-1. The results are shown in Table II-4.

Example II-3

The same procedure as in Example II-1 was performed. However, the concentration of the monomer mixture fed into the first reactor was 20% by weight, the feed rate of the monomer was 0.37 kg/hr, the amount of catalyst fed was 0.12 mmole of lanthanum varsaticate, 0.58 mmole of dibutyl magnesium, and 0.8 mmole of n-butyl lithium per 100 g of monomer. The conversion at the outlet of the first reactor was 73%.

The concentration of the monomer mixture fed to the second reactor was 20% by weight, the feed rate of the monomer was 0.25 kg/hr, the amount of n-butyl lithium was 2.3 mmole per 100 g of monomer introduced into the second reactor, and the polymerization was performed with the internal temperature of the second reactor held to 110° C. This was used as sample II-C. The results of analysis are shown in Table II-1. The resultant polymer (polymer composition) was evaluated in the same way as Example II-1. The results are shown in Table II-4.

Example II-4

The same procedure as in Example II-1 was performed. However, the feed rate of the monomer introduced at the bottom of the second reactor was 0.93 kg/hr, the amount of n-butyl lithium was 1.22 mmole per 100 g of monomer introduced in the second reactor, the amount of tetramethylethylenediamine was 1.1 mmole per 100 g of the monomer introduced in the second reactor, and the polymerization was performed while holding the internal temperature of the second reactor at 100° C. This was used as sample II-D. The results of analysis are shown in Table II-1. The resultant polymer (polymer composition) was evaluated in the same way as Example II-1. The results are shown in Table II-4.

unit mmole/100 g monomer, described in U.S. Pat. No. 4,297,240) was added and polymerization performed at 60° C. for 1 hour. Part of this was sampled, then 1155 g of cyclohexane mixture containing 231 g of 1,3-butadiene and a cyclohexane solution of Na tertiary amylate and TMEDA (Na/Mg molar ratio =0.77, TMEDA/Mg molar ratio of 0.61) were added and the polymerization performed at 50° C. for one hour. After this, methanol was added to stop the reaction, then the same procedure was in Example II-1 was followed and the polymer obtained. The resultant polymer and the portion sampled midway were analyzed. The values are shown in Table II-2.

Comparative Example II-2

The same procedure was followed as in Comparative Example II-1. However, the Ba-Mg-Al initiator was added and the polymerization performed at 60° C. for 5 hours. To this was added the Na tertiary amylate and TMEDA and the polymerization continued at 50° C. for one hour. The obtained polymer was used as sample II-E. The results are shown in Table II-2.

The TSBR polymer sampled midway could not be crystallized by the method of using the same n-hexanecyclohexane mixture as in Example II-1. Further, the same applied to the finally obtained polymer. Still further, the cold flow of the resultant polymer "col-

TABLE II-1

| | Example | | | |
|---|---|---|---|---|
| | II-1 | II-2 | II-3 | II-4 |
| Analysis values of polymer of outlet of first reactor | | | | |
| Glass transition temperature | −85° C. | −85° C. | −85° C. | −85° C. |
| Crystal melting point | +82° C. | +82° C. | +82° C. | +82° C. |
| Microstructure | | | | |
| Trans | 86% | 86% | 86% | 86% |
| Vinyl | 6% | 6% | 4% | 6% |
| Cis | 8% | 8% | 10% | 8% |
| Molecular weight $\overline{M}w$ ($\times 10^4$) | 10.5 | 10.5 | 17 | 10.5 |
| Molecular weight distribution $\overline{M}w/\overline{M}n$ | 2.3 | 2.3 | 2.4 | 2.3 |
| Analysis values of polymer of outlet of second reactor | | | | |
| Microstructure | | | | |
| Trans | 61% | 56% | 66% | 53% |
| Vinyl | 11% | 12% | 9% | 24% |
| Cis | 28% | 32% | 25% | 23% |
| Molecular weight $\overline{M}w$ ($\times 10^4$) | 17 | 20 | 22 | 18 |
| Molecular weight distribution $\overline{M}w/\overline{M}n$ | 2.2 | 2.4 | 2.2 | 2.3 |
| Mooney viscosity $ML_{1+4}$ (100° C.) | 34 | 40 | 45 | 36 |
| Ratio of high trans PB polymerized in first reactor | 30 wt % | 12 wt % | 44 wt % | 25 wt % |
| Ratio of high trans homopolymer by separation | | | | |
| To total polymer | 0.5 wt % | 0.7 wt % | 1.2 wt % | 2.0 wt % |
| To high trans polymer polymerized in first reactor | 1.7 wt % | 5.8 wt % | 2.0 wt % | 8.0 wt % |
| Low trans polymer polymerized in second reactor | | | | |
| Microstructure | | | | |
| Trans | 50% | 52% | 51% | 42% |
| Vinyl | 13% | 13% | 13% | 30% |
| Cis | 37% | 35% | 36% | 28% |
| Samples | II-A | II-B | II-C | II-D |

Comparative Example II-1

Into a 5 liter reactor equipped with an agitator and jacket were introduced 945 g of a cyclohexane mixture containing 161 g of 1,3-butadiene and 28 g of styrene, then a Ba-Mg-Al initiator (Ba/Mg/Al=0.18/0.57/0.04 lapsed at one day"in the evaluation by the method shown in Example II-1 and so was not desirable.

Sample II-E was formulated, vulcanized, and evaluated by the same methods as in Example II-1. The results are shown in Table II-4.

TABLE II-2

| | Midway sampling | | | | Final polymer | | | | | |
|---|---|---|---|---|---|---|---|---|---|---|
| | Conversion (%) | Trans content *1 (%) | Bound styrene *1 (wt %) | Weight average molecular weight | Conversion (%) | Trans content *1 (%) | Vinyl content *1 (%) | Bound styrene *1 (wt %) | Weight average molecular weight | $\overline{Mw}/\overline{Mn}$ |
| Com. ex. II-1 | 18 | 77 | 4 | $0.7 \times 10^4$ | 90 | 30 | 55 | 6 | $8 \times 10^4$ | 2.8 |
| Com. ex. II-2 | 55 | 76 | 5 | $2.1 \times 10^4$ | 83 | 40 | 43 | 5 | $7 \times 10^4$ | 3.5 |

*1 Measured using infrared spectrophotometer and Hampton method.

Comparative Example II-3 (Sample II-F)

Using the same method as in Example II-1, the polymer of the first reactor was sampled and a high trans resinous polybutadiene homopolymer was obtained (sample II-F-1).

Using n-butyl lithium, an ordinary polybutadiene was obtained ($ML_{1+4}$ (100° C.) of 35, $\overline{Mw}$ of 190,000, $\overline{Mw}/\overline{Mn}$ of 2.2, trans of 52%, vinyl of 13%, and cis of 35%) (sample II-F-2).

Thirty parts by weight of the sample II-F-1 and 70 parts by weight of the sample II-F-2 were used and using this as raw rubber, formulation, vulcanization, and evaluation were performed by the same method as in Example II-1. The results are shown in Table II-4.

same method as in Example II-1. The results are shown in Table II-4.

TABLE II-3

| Formulation | Parts by weight |
|---|---|
| Raw rubber | 100 |
| Aromatic oil *1 | 5 |
| N-399 carbon black *2 | 50 |
| Stearic acid | 2 |
| Zinc oxide | 3 |
| Accelerator CZ *3 | 1 |
| Sulfur | 1.7 |

*1 Kyodo Sekiyu Co. X-140
*2 Iodine adsorption (IA) 90 mg/g Dibutylphthalate adsorption (DBP) 199 ml/100 g
*3 N-cyclohexy-2-benzothiazylsulfenamide
Vulcanization conditions: 160° C. × 20 minutes

TABLE II-4

| | Sample No. | | | | | | | |
|---|---|---|---|---|---|---|---|---|
| | II-A | II-B | II-C | II-D | II-E | II-F | II-G | II-H |
| Mooney viscosity of formulation $ML_{1+4}$ 100° C. | 62 | 66 | 64 | 63 | 47 | 67 | 66 | 70 |
| Mill behavior | ⊙ | ○ | ⊙ | ⊙ | x (sticky) | ○ | ○ | ○ |
| Hardness (JIS-A) | 64 | 62 | 67 | 64 | 61 | 63 | 63 | 62 |
| 300% modulus (kg/cm²) | 90 | 82 | 93 | 90 | 82 | 81 | 83 | 75 |
| Tensile strength (kg/cm²) | 210 | 190 | 223 | 205 | 165 | 185 | 180 | 180 |
| Elongation (%) | 530 | 520 | 540 | 525 | 480 | 500 | 515 | 520 |
| Lupke resilience | | | | | | | | |
| Room temperature (%) | 60 | 59 | 60 | 58 | 55 | 56 | 55 | 58 |
| 70° C. (%) | 64 | 63 | 64 | 63 | 58 | 60 | 59 | 61 |
| Goodrich heat build-up 50° C. (°C.) | 38 | 38 | 39 | 37 | 55 | 50 | 49 | 38 |
| Pico wear resistance (index) | 135 | 115 | 145 | 120 | 95 | 105 | 100 | 100 |
| Wet skid resistance (index) | 100 | 100 | 98 | 104 | 110 | 100 | 104 | 100 |
| Cut resistance (rating) | 4 | 3 | 5 | 4 | 2 | 1 | 2 | 2 |

*⊙ Excellent
○ Good
Δ Fair
x Poor

Comparative Example II-4 (Sample II-G)

Using the same method as Example II-1, the polymer of the first reactor was sampled and a high trans polybutadiene homopolymer was obtained (sample II-F-1).

Using n-butyl lithium and tetramethylethylenediamine, an ordinary polybutadiene was obtained ($ML_{1+4}$ (100° C.) of 35, $\overline{Mw}$ of 210,000, $\overline{Mw}/\overline{Mn}$ of 2.0, 42% trans, 30% vinyl, and 28% cis) (sample II-G-2).

Twenty-five parts by weight of the sample II-F-1 and 75 parts by weight of the sample II-G-2 were used and using this as raw rubber, formulation, vulcanization, and evaluation were performed by the same method as in Example II-1. The results are shown in Table II-4.

Comparative Example II-5

Using n-butyl lithium, an ordinary polybutadiene was obtained ($ML_{1+4}$ (100° C.) of 35, $\overline{Mw}$ of 190,000, $\overline{Mw}/\overline{Mn}$ of 2.2, 52% trans, 13% vinyl, and 35% cis) (sample II-H). Using this as raw rubber, formulation, vulcanization, and evaluation were performed by the From the results of evaluation in Table II-4, samples II-A, II-B, II-C, and II-D. Which were from examples of the present invention, were superior to samples II-E, II-F, II-G, and II-H, which were comparative examples, in terms of physical properties and workability. Specifically, the polymer sample II-A of the present invention was superior in workability, tensile strength, resilience, heat build-up, and wear resistance to the sample II-F, which is a corresponding polymer blend.

The same applies to the comparison of the polymer sample II-D of the present invention and the corresponding polymer blend of sample II-G.

The polymer sample II-B of the present invention was improved in cold flow, tensile strength, resilience, and wear resistance compared with the conventional polymer sample II-H of the comparative example.

Example II-5 and Comparative Example II-6 and II-7

Sixty parts by weight of samples II-A, II-F, and II-H and 40 parts of natural rubber, for a total of 100 parts by weight, were used as the raw rubber and similarly formulated, vulcanized, and evaluated. The results are shown in Table II-5.

polymer (polymer composition) of the present invention were obtained.

TABLE II-6

|  | Ex. II-6 | Ex. II-7 | Ex. II-8 | Comp. Ex. II-8 | Comp. Ex. II-9 | Comp. Ex. II-10 | Comp. Ex. II-11 |
|---|---|---|---|---|---|---|---|
| Sample |  |  |  |  |  |  |  |
| II-A (parts by weight) | 50 | 30 | — | — | — | — | — |
| II-B (parts by weight) | — | — | 40 | — | — | — | — |
| II-F (parts by weight) | — | — | — | 50 | 30 | — | — |
| II-H (parts by weight) | — | — | — | — | — | 40 | — |
| SBR 1502 | 50 | 70 | 60 | 50 | 70 | 60 | 100 |
| Lupke resilience (70° C., %) | 60 | 59 | 59 | 58 | 57 | 57 | 56 |
| Pico wear resistance (index) | 155 | 145 | 140 | 135 | 125 | 130 | 100 |
| Wet skid resistance (index) | 87 | 93 | 90 | 87 | 93 | 90 | 100 |

According to the results of Table II-5, Example II-5 of the present invention (sample II-A) was superior to Comparative Example II-6 (sample II-F) and II-7 (II-H) in terms of both physical properties and workability. Specifically, when the polymer II-A of the present invention was used, the workability, tensile strength, resilience, and heat build-up were superior compared to the corresponding polymer blend (sample II-F) and further the wear resistance and cut resistance were improved. When the polymer was used in a blend with natural rubber too, the superior features of the polymer (polymer composition) of the present invention could be obtained.

Example II-9

Polymerization was performed in the same way as in Example II-1 using two polymerization vessels, then the polymer solution from the second reactor was further introduced into a third reactor, 0.08 phr of tetraglycidyl-1,3-bisaminomethylcyclohexane was added continuously, and the coupling reaction performed, then in the same way as in Example II-, 1,2,4-ditertiary butyl-p-cresol was mixed in to obtain the sample. This was used as sample II-I. The Mooney viscosity $ML_{1+4}$ (100° C.) was 62, the average molecular weight $\overline{M}w$ by GPC was 220,000, the molecular weight distribution $\overline{M}w/\overline{M}n$ was

TABLE II-5

|  | Ex. II-5 | Comp. Ex. II-6 | Comp. Ex. II-7 |
|---|---|---|---|
| Sample |  |  |  |
| II-A (parts by weight) | 60 | — | — |
| II-F (parts by weight) | — | 60 | — |
| II-H (parts by weight) | — | — | 60 |
| Natural rubber (parts by weight) | 40 | 40 | 40 |
| Mooney viscosity of formulation $ML_{1+4}$ 100° C. | 52 | 58 | 60 |
| Mill behavior | ⊚ | ∘ | ∘ |
| Hardness (JIS-A) | 64 | 63 | 62 |
| 300% modulus (kg/cm$^2$) | 105 | 96 | 92 |
| Tensile strength (kg/cm$^2$) | 250 | 225 | 220 |
| Elongation (%) | 535 | 530 | 540 |
| Lupke resilience |  |  |  |
| Room temperature (%) | 60 | 58 | 59 |
| 70° C. (%) | 65 | 62 | 62 |
| Goodrich heat build-up 50° C. (°C.) | 32 | 42 | 34 |
| Pico wear resistance (index) | 112 | 92 | 90 |
| Wet skid resistance (μm) | 105 | 105 | 105 |
| Cut resistance (rating) | 4 | 1 | 1 |

Examples II-6 to II-8 and Comparative Examples II-8 to II-11

Samples II-A, II-B, II-F, and II-H and styrene-butadiene copolymer rubber were used as the raw rubber and formulated, vulcanized, and evaluated by the formulation shown in Table II-3. The raw rubber composition and the results are shown in Table II-6.

According to the results of Table II-6, Examples II-6 to II-8 of the polymer (polymer composition) of the present invention and SBR blend were superior in the performance balance compared with Comparative Examples II-8 to II-11. Specifically, Examples II-6 and II-7, as opposed to the corresponding Comparative Examples II-8 and II-9, and Example II-8, as opposed to the corresponding Comparative Example II-10, were all superior in the balance of the wear resistance and wet skid and the balance of the high temperature impact resilience and the wet skid. In the case of use of blends with other rubbers too, the superior features of the 2.4, and the GPC graph was a broad single peak. The cold flow of the resultant sample II-I was measured, whereupon it was found that there was no cold flow even after 10 days.

Sample II-I was formulated, vulcanized, and evaluated in physical properties in the same way as Example II-1. The results are shown in Table II-7.

Example II-10

Polymerization was performed in the same way as in Example II-4 using two polymerization vessels, then the polymer solution from the second reactor was further introduced into a third reactor, 0.25 phr of dicyclohexylcarbodiimde was added continuously, and terminal modification performed, then in the same way as in Example II-4, a sample was obtained. This was used as sample II-J. The Mooney viscosity $ML_{1+4}$ (100° C.) was 38. This was evaluated in the same way as Example II-12. The results are shown in Table II-7.

Example II-11

Polymerization was performed in the same way as in Example II-4 using two polymerization vessels, then the polymer solution from the second reactor was further introduced into a third reactor, 0.27 phr of tin tetrachloride and 0.27 phr of tributyl tin chloride were added continuously, and the coupling reaction and terminal modification simultaneously performed, then in the same way as in Example II-4, a sample was obtained. This was used as sample K. The Mooney viscosity $ML_{1+4}$ (100° C.) was 51, the average molecular weight $\overline{M}w$ by GPC was 210,000, the molecular weight distribution $\overline{M}w/\overline{M}n$ was 2.3, and the GPC graph was a broad single peak. This was evaluated in the same way as Example II-12. The results are shown in Table II-7.

Example II-12

Using a 10 liter internal capacity stainless steel reactor equipped with an agitator and jacket, 0.616 kg of 1,3-butadiene, 2.464 kg of cyclohexane, and catalyst were charged and batch polymerization performed. The catalyst was, per 100 g of monomer, 0.075 mmole of lanthanum varsaticate, 0.40 mmole of dibutyl magnesium, and 0.15 mmole of n-butyl lithium. The reaction was performed at 65° C. for 2 hours. The conversion was measured by sampling and found to be 64%. The microstructure of the polymer was 89% trans, 4% vinyl, and 7% cis. The glass transition temperature by DSC, was 87° C., the crystalline melting point $-95°$ C., the molecular weight $\overline{M}w$ by GPC was 85,000, the molecular weight distribution $\overline{M}w/\overline{M}n$ was 1.2, and the GPC graph was a sharp single peak.

To the high trans polybutadiene solution were added 0.504 kg of additional 1,3-butadiene, 2.016 kg of cyclohexane, and 0.081 phr of n-butyl lithium per additional butadiene (parts by weight feed per 100 parts by weight of monomer) and the polymerization performed at an internal temperature of 110° C. for 1 hour. The conversion was determined by sampling and found to be 98%. The microstructure of the polymer was 65% trans, 10% vinyl, and 25% cis. The Mooney viscosity $ML_{1+4}$(100° C.) was 28, the molecular weight $\overline{M}w$ by GPC was 150,000, the molecular weight distribution $\overline{M}w/\overline{M}n$ was 1.4, and the GPC graph was two peaks.

To the polymer solution in the reactor was added 0.043 phr (parts by weight of feed per 100 parts by weight of rubber) of tin tetrachloride and a coupling reaction performed.

The polymer solution was treated in the same way as Example II-1 to obtain the polymer. This was used as sample II-L. The Mooney viscosity $ML_{1+4}$ (100° C.) was 65, the molecular weight $\overline{M}w$ by GPC was 230,000, and the molecular weight distribution $\overline{M}w/\overline{M}n$ was 1.6. The ratio of the resinous trans polybutadiene portion in the resultant composite polymer was 35% by weight. The microstructure of the low trans rubbery polybutadiene portion was 52% trans, 13% vinyl, and 35% cis, it was calculated.

In the same way as Example II-1, the resin high trans polybutadiene homopolymer was measured by fractionization, whereupon it was found that no precipitate was produced and almost no resinous high trans polybutadiene homopolymer was produced.

The cold flow of the obtained sample II-L was measured, whereupon it was found that there was no cold flow at all even after 10 days.

The sample was evaluated in the same way as Example II-9. The results are shown in Table II-7.

TABLE II-7

| Sample | II-I | II-J | II-K | II-L |
|---|---|---|---|---|
| Mooney viscosity of formulation $ML_{1+4}$ 100° C. | 77 | 66 | 69 | 65 |
| Mill behavior | o | o | o | o |
| Hardness (JIS-A) | 64 | 64 | 63 | 64 |
| 300% modulus (kg/cm$^2$) | 95 | 91 | 94 | 88 |
| Tensile strength (kg/cm$^2$) | 220 | 215 | 215 | 215 |
| Elongation (%) | 520 | 510 | 510 | 530 |
| Lupke resilience | | | | |
| Room temperature (%) | 62 | 60 | 61 | 65 |
| 70° C. (%) | 67 | 67 | 66 | 73 |
| Goodrich heat build-up 50° C. (°C.) | 35 | 36 | 36 | 32 |
| Pico wear resistance (index) | 138 | 122 | 125 | 138 |
| Wet skid resistance (μm) | 100 | 104 | 104 | 99 |

Examples II-13 to II-18 and Comparative Examples II-12 to II-17

Raw rubber containing the sample II-A of the polymer (polymer composition) of the present invention of the various compositions shown in Table II-8 and raw rubber containing the sample II-H of polymer for comparison were kneaded in the formulation shown in Table II-3 and evaluated as to performance. The results are shown in Table II-8.

From the results of Table II-8, it is clear that the rubber compositions containing the polymer (polymer composition) of the present invention are improved in the balance of the wet skid characteristics, necessary for tire rubber compositions, and rolling resistance performance (resilience at 70° C.) and the balance of the wet skid characteristics and the wear resistance, compared with compositions containing the conventional polybutadiene for comparison, and are thus useful compositions.

TABLE II-8

| | Ex. II-13 | Comp. Ex. II-12 | Ex. II-14 | Comp. Ex. II-13 | Ex. II-15 | Comp. Ex. II-14 | Ex. II-16 | Comp. Ex. II-15 | Ex. II-17 | Comp. Ex. II-16 | Comp. Ex. II-11 | Ex. II-18 | Comp. Ex. II-17 |
|---|---|---|---|---|---|---|---|---|---|---|---|---|---|
| Raw rubber composition | | | | | | | | | | | | | |
| Sample II-A (wt %) | 50 | — | 35 | — | 30 | — | 25 | — | 40 | — | — | 80 | — |
| Sample II-H (wt %) | — | 50 | — | 35 | — | 30 | — | 25 | — | 40 | — | — | 80 |
| Natural rubber (wt %) | 25 | 25 | 15 | 15 | — | — | — | — | 20 | 20 | — | — | — |
| High cis BR *1 (wt %) | 25 | 25 | — | — | — | — | 25 | 25 | — | — | — | 20 | 20 |
| High vinyl BR *2 (wt %) | — | — | 50 | 50 | — | — | — | — | — | — | — | — | — |
| Solprene 1204 *3 (wt %) | — | — | — | — | 70 | 70 | — | — | 40 | 40 | — | — | — |
| SBR 1500 (wt %) | — | — | — | — | — | — | 50 | 50 | — | — | 100 | — | — |
| Processability *4 | ⊙ | Δ | o | Δ | o | Δ | ⊙ | o | ⊙ | o | o | o | Δ |
| Resilience (70° C.) | 63 | 61 | 59 | 57 | 64 | 61 | 60 | 58 | 62 | 59 | 56 | 64 | 60 |
| Pico wear resistance (index) | 180 | 160 | 110 | 103 | 120 | 111 | 150 | 137 | 130 | 122 | 100 | 195 | 170 |

TABLE II-8-continued

| | Ex. II-13 | Comp. Ex. II-12 | Ex. II-14 | Comp. Ex. II-13 | Ex. II-15 | Comp. Ex. II-14 | Ex. II-16 | Comp. Ex. II-15 | Ex. II-17 | Comp. Ex. II-16 | Comp. Ex. II-11 | Ex. II-18 | Comp. Ex. II-17 |
|---|---|---|---|---|---|---|---|---|---|---|---|---|---|
| Wet skid resistance (index) | 83 | 84 | 100 | 100 | 96 | 96 | 86 | 86 | 91 | 91 | 100 | 81 | 81 |

*1 High cis BR . . . JSR BR01 . . . made by Japan Synthetic Rubber Co.
*2 High vinyl BR . . . Nipol 1240 . . . made by Japan Zeon Co.
*3 Solprene 1204 . . . made by Japan Elastomer Co.
*4 ⊚ Excellent
∘ Good
Δ Fair
x Poor As clear from the above, the polymer (polymer composition) of the present invention is superior in cold flow and further the rubber composition of the present invention is superior in the balance of the wear resistance and wet skid resistance and is improved in strength and processability. Further, when used blended with other rubbers, it has the superior effect of forming a composition highly balanced in wear resistance cut resistance, and other physical properties and processability.

EXAMPLE GROUP III

Example III-1

Two 10 liter internal capacity, stainless steel reactor with a ratio of height to diameter (L/D) of 4 and equipped with agitators and jackets were connected in series. From the bottom of the first reactor was continuously fed an n-hexane solution of 1,3-butadiene and, as a catalyst, lanthanum varsaticate, dibutyl magnesium, and butyl lithium. The internal temperature was maintained at 75° C. and the polymerization performed. The concentration of the monomer mixture was 18% by weight and the feed rate of the monomer was 0.67 kg/hr. The amount of feed of the catalyst was 0.15 mmole of lanthanum varsaticate, 0.75 mmole of dibutyl magnesium, and 0.10 mmole of n-butyl lithium per 100 g of monomer.

Sampling was performed from the outlet of the first reactor and the conversion measured and found to be 59.8%. The microstructure of the resultant polymer was 86% trans, 6% vinyl, and 8% cis. The glass transition temperature by DSC was −85° C., the crystalline melting point was +82° C., the molecular weight $\overline{M}w$ by GPC was 105,000, the $\overline{M}n$ was 45,000, the molecular weight distribution $\overline{M}w/\overline{M}n$ was 2.3, and the GPC graph was a broad single peak.

The polymer solution from the first reactor was introduced into the bottom of the second reactor. An additional monomer mixture comprised of 1,3-butadiene, styrene, and n-hexane was introduced from the bottom of the second reactor. The concentration of the monomer mixture was 26% by weight, the feed rate of the 1,3-butadiene was 0.69 kg/hr, and the feed rate of the styrene was 0.46 kg/hr. Further, an additional monomer mixture comprised of 1,3-butadiene and n-hexane was introduced from a position two-thirds down from the top of the second reactor. The concentration of the monomer mixture was 26% by weight, and the feed rate of the 1,3-butadiene was 0.41 kg/hr. The amount of the n-butyl lithium introduced into bottom of the second reactor was 1.373 mmole per 100 g monomer introduced into the second reactor. The internal temperature of the second reactor was maintained at 120° C. for the polymerization, then the polymer solution from the second reactor was continuously mixed with 0.6 phr of 2,4-ditertiary butyl-p-cresol (parts by weight per 100 parts of rubber). This was mixed and introduced into hot water for steam stripping and the solvent removed. The resultant rubber was dried by a hot roll.

The conversion at the second reactor outlet was 99.5% of the 1,3-butadiene and 98.5% of the styrene. The microstructure of the resultant rubber was determined by the Hampton method using an infrared spectrophotometer and was found to be 20.5% by weight of bonded styrene. The microstructure of the polybutadiene portion was 59% trans, 11% vinyl, and 30% cis. The Mooney viscosity $ML_{1+4}$ (100° C.) was 45, the average molecular weight $\overline{M}w$ by GPC was 190,000, the $\overline{M}n$ was 90,000, and the GPC graph was a broad single peak. Further, the block styrene content was 0.2% by weight per total rubber. Note that the measurement of the block styrene was performed by the osmic acid decomposition method (J. Poly. Sci, 1, 429 (1946)).

The obtained butadiene polymer was used as sample III-A.

From the above results, the 86% trans resin polybutadiene portion polymerized at the first reactor was 18% by weight of the total polymer obtained, the low trans rubber polybutadiene portion polymerized at the second reactor was 88% by weight, and the microstructure of the low trans rubber polybutadiene polymerized at the second reactor was 53% trans, 12% vinyl, and 35% cis.

Two grams of the resultant butadiene polymer was heated and dissolved in 100 ml of a mixed solvent of n-hexane and cyclohexane, then this was cooled to 0° C. and centrifuged while held at 0° C. and the precipitate and solution separated. The resultant precipitate was vacuum dried and then weighed, whereupon it was found that it was 1.3% by weight of the butadiene polymer. In other words, the high trans resinous polybutadiene homopolymer was 7.2% by weight of the polymer of the first reactor (total of the high trans resinous polybutadiene block portion in block polymer and high trans resinous polybutadiene homopolymer).

By way of reference, the high trans resinous polybutadiene homopolymer sampled from the first reactor and the low trans rubbery butadiene styrene random copolymer polymerized by n-butyl lithium alone (bound styrene of 25% by weight, block styrene of 0.1% by weight, $\overline{M}w$ of 90,000, $\overline{M}w/\overline{M}n$ of 2.2, microstructure of 52% trans, 13% vinyl, and 35% cis) were blended 50:50 and fractionization performed separately, whereupon the resultant precipitate was 46% by weight of the blend polymer.

It was learned that the polymer obtained from this is a polymer composition having as principal components a block polymer comprised of a high trans resinous polybutadiene block and a low trans rubbery butadiene-styrene copolymer block and a low trans rubbery polybutadiene-styrene copolymer.

The cold flow of the resultant polymer was measured, whereupon it was found that there was substantially no cold flow.

The resultant polymer: No cold flow even after three days

Tufdene 2000 (commercially available product): Collapse after 2 days (a rectangular parallel piped rubber sample of 3 cm×3 cm×10 cm (height) was fixed to a 30 degree slanted base and the slanting state observed.)

Examples III-2 and III-3

The same method was followed as in Example III-1. However, the monomer feed rate, composition, amount of catalyst, etc., of the first and second reactors were changed. The resultant polymers were used respectively as the samples III-B and III-C. The analysis values are shown in Table III-1.

Example III-4

The same method was followed as in Example III-1. However, the monomer feed rate and composition, amount of catalyst, etc., of the first and second reactors were changed. Further, 1.2 moles of tetramethylethylene diamine per mole of the n-butyl lithium fed at the second reactor was fed from the bottom of the second reactor together with the monomer, catalyst, etc. The resultant polymer was used as sample III-D. The analysis values are shown in Table III-1.

The sample III-D was measured for its styrene chain distribution by the ozone decomposition—GPC method and as a result it was found that the isolated styrene accounted for 67% by weight of the total bound styrene, that the long chain block styrene (chains of 8 or more styrene units) accounted for 0.6% by weight of the total bound styrene, and that the product was a completely random copolymer.

Example III-5

The same method was followed as in Example III-4. However, the monomer feed rate, composition, amount of catalyst, etc., of the first and second reactors were changed. Further, 0.4 mole of tetramethylethylene diamine per mole of the n-butyl lithium fed at the second reactor was fed from the bottom of the second reactor together with the monomer, catalyst, etc. The resultant polymer was used as sample III-E. The analysis values are shown in Table III-1.

The sample III-E was measured for its styrene chain distribution by the ozone decomposition—GPC method and as a result it was found that the isolated styrene accounted for 62% by weight of the total bound styrene, that the long chain block styrene accounted for 1.2% by weight of the total bound styrene, and that the product was a completely random copolymer.

The obtained samples III-B to III-E were subjected to a cold flow test in the same way as Example III-1, whereupon it was found that there was no cold flow even after 3 days.

TABLE III-1

| | Examples | | | | |
|---|---|---|---|---|---|
| | III-1 | III-2 | III-3 | III-4 | III-5 |
| Analysis values of polymer of outlet of first reactor | | | | | |
| Glass transition temperature | −85° C. | −86° C. | −85° C. | −85° C. | −85° C. |
| Crystalline melting point | +82° C. | +85° C. | +79° C. | +82° C. | +82° C. |
| Microstructure | | | | | |
| Trans | 86% | 87% | 85% | 86% | 86% |
| Vinyl | 6% | 4% | 4% | 5% | 5% |
| Cis | 8% | 9% | 11% | 9% | 9% |
| Molecular weight $\overline{Mw}$ (× $10^4$) | 10.5 | 9 | 16 | 11 | 10 |
| Molecular weight distribution Mw/Mn | 2.3 | 2.1 | 2.4 | 2.3 | 2.2 |
| Analysis values of polymer of outlet of second reactor | | | | | |
| Bound styrene wt % | 20.5 | 16.2 | 9.0 | 12.6 | 15.0 |
| Block styrene wt % | 0.2 | 0.2 | 0.3 | 0 | 0 |
| Microstructure | | | | | |
| Trans | 59% | 56% | 65% | 54% | 57% |
| Vinyl | 11% | 11% | 9% | 26% | 16% |
| Cis | 30% | 33% | 26% | 20% | 27% |
| Molecular weight $\overline{Mw}$ (× $10^4$) | 19 | 21 | 20 | 23 | 20 |
| Molecular weight distribution Mw/Mn | 2.1 | 2.2 | 2.4 | 2.1 | 2.0 |
| Mooney viscosity $ML_{1+4}$ (100° C.) | 45 | 50 | 41 | 53 | 45 |
| Ratio of high trans PB polymerized in first reactor/total polymer | 18 wt % | 10 wt % | 40 wt % | 30 wt % | 25 wt % |
| Ratio of high trans homopolymer by separation | | | | | |
| To total polymer | 1.3 wt % | 0.8 wt % | 1.1 wt % | 2.2 wt % | 0.9 wt % |
| To high trans polymer polymerized in first reactor | 7.2 wt % | 8 wt % | 2.8 wt % | 7.3 wt % | 3.6 wt % |
| Low trans polymer polymerized in second reactor | | | | | |
| Bound styrene wt % | 25 | 18 | 15 | 18 | 20 |
| Block styrene wt % | 0.2 | 0.2 | 0.5 | 0 | 0 |
| Microstructure | | | | | |
| Trans | 53% | 52% | 51% | 40% | 47% |
| Vinyl | 12% | 12% | 12% | 35% | 20% |
| Cis | 35% | 36% | 37% | 25% | 33% |
| Samples | III-A | III-B | III-C | III-D | III-E |

Comparative Example III-1

Into a 5 liter reactor equipped with an agitator and jacket were introduced 945 g of a cyclohexane mixture containing 161 g of 1,3-butadiene and 28 g of styrene, then a Ba-Mg-Al initiator (Ba/Mg/Al-0.18/0.57/0.04 unit mmole/100 g monomer, described in U.S. Pat. No. 4,297,240) was added and polymerization performed at 60° C. for 1 hour. Part of this was samples, then 1155 g of cyclohexane mixture containing 231 g of 1,3-butadiene and a cyclohexane solution of Na tertiary amylate and TMEDA (Na/Mg molar ratio=0.77, TMEDA/Mg molar ratio of 0.61) were added and the polymerization performed at 50° C. for one hour. After this, methanol was added to stop the reaction, then the same procedure was in Example III-1 was followed and the polymer obtained. Analysis values of the resultant polymer and the midway sampling are given in Table III-2.

Comparative Example III-2

The same procedure was followed as in Comparative Example III-1. However, the Ba-Mg-Al initiator was added and the polymerization carried out at 60° C. for 5 hours. To this was added the Na tertiary amylate and TMEDA and the polymerization continued at 50° C. for 1 hour. The resultant polymer was used as sample III-F. The results are shown in Table III-2.

The TSBR polymer sampled midway, like in Example III-1, could not be crystallized by the method of use of a mixed solvent of n-hexane and cyclohexane. Further, the same applied to the polymer finally obtained. The cold flow of the resultant polymer was evaluated by the method shown in Example III-1 and the result was "collapse in one day", which is not desirable.

Comparative Example III-5 (Sample III-I)

Using n-butyl lithium, ordinary butadiene-styrene random copolymer ($ML_{1+4}$ (100° C.) of 45, $\overline{M}w$ of 200,000, $\overline{M}w/\overline{M}n$ of 2.1, bound styrene of 25% by weight, block styrene of 0.5% by weight, 52% trans, 12% vinyl, and 36% cis) was obtained, used as sample III-I.

Evaluation

The samples III-A to III-I were formulated by the formulation shown in Table III-3, vulcanized, and evaluated as to performance. The results are shown in Table III-4.

Evaluation Methods

The method of evaluation entails obtaining the formulation by the method B of the standard formulation and mixture procedure of ASTM-D-3403-75 using a pressurized kneader with an internal capacity of 300 cc, vulcanizing the same, then measuring the physical properties.

(1) Hardness and tensile strength: According to JIS-K-6301.

TABLE III-2

|  | Midway sampling | | | | Final polymer | | | | | |
| --- | --- | --- | --- | --- | --- | --- | --- | --- | --- | --- |
|  | Conversion (%) | Trans content *1 (%) | Bound styrene *1 (wt %) | Weight average molecular weight | Conversion (%) | Trans content *1 (%) | Vinyl content *1 (%) | Bound styrene *1 (wt %) | Weight average molecular weight | $\overline{M}w/\overline{M}n$ |
| Comp. Ex. III-1 | 18 | 77 | 4 | $0.7 \times 10^4$ | 90 | 30 | 55 | 6 | $8 \times 10^4$ | 2.8 |
| Comp. Ex. III-2 | 55 | 76 | 5 | $2.1 \times 10^4$ | 83 | 40 | 43 | 5 | $7 \times 10^4$ | 3.5 |

*1 Measured using infrared spectrophotometer and Hampton method.

Comparative Example III-3 (Sample III-G)

Using the same method as in Example III-1, the polymer of the first reactor was sampled and a high trans resinous polybutadiene homopolymer was obtained (sample III-G-1).

Using n-butyl lithium, ordinary butadiene-styrene random copolymer $ML_{1+4}$ (100° C.) of 45, $\overline{M}w$ of 200,000, $\overline{M}w/\overline{M}n$ of 2.1, bound styrene of 25% by weight, 52% trans, 12% vinyl, and 36% cis) was obtained (sample III-G-2).

Eighteen parts by weight of sample III-G-1 and 82 parts by weight of sample III-G-2 were blended to make sample III-G.

Comparative Example III-4 (Sample III-H)

Using the same method as in Example III-1, the polymer of the first reactor was sampled and a high trans resinous polybutadiene homopolymer was obtained (sample III-G-1).

Using n-butyl lithium and tetramethylethylenediamine, ordinary butadiene-styrene random copolymer ($ML_{1+4}$ (b 100° C.) of 55, $\overline{M}w$ of 230,000, $\overline{M}w/\overline{M}n$ of 2.0, bound styrene of 18% by weight, block styrene of 0%, 40% trans, 35% vinyl, and 25% cis) was obtained (sample III-H-2).

Thirty parts by weight of sample III-G-1 and 70 parts by weight of sample III-H-2 were blended to make sample III-H.

(2) Resilience: Lupke method according to JIS-K-6301. However the resilience at 70° C. is measured by preheating the sample in a 70° C. oven for one hour, then quickly taking it out.

(3) Goodrich heat build-up

Use was made of a Goodrich flexometer and the test run with an applied load of 24 pounds, a displacement of 0.225 inch, a starting temperature of 50° C., and a speed of 1800 rpm. The difference in the rise in temperature after 20 minutes was shown.

(4) Wet skid resistance

Use was made of a Stanley London portable skid tester. As the road surface, use was made of a safety walk (made by 3M). Measurement was by the method of ASTM-E-808-74.

(5) Wear resistance

Use was made of a Pico wear tester for the evaluation and the results shown by an index. The larger the value, the better.

TABLE III-3

| Formulation | Parts by weight |
| --- | --- |
| Raw rubber | 100 |
| Aromatic oil *1 | 5 |
| N-399 carbon black *2 | 45 |
| Stearic acid | 2 |
| Zinc oxide | 5 |
| Accelerator CZ *3 | 1 |
| Sulfur | 1.7 |

*1 Kyodo Sekiyu Co. X-140
*2 Iodine adsorption (IA) 90 mg/g Dibutylphthalate adsorption (DBP) 199 ml/100 g
*3 N-cyclohexyl-2-benzothiazylsulfenamide
Vulcanization conditions: 160° C. × 20 minutes

TABLE III-4

| Sample | III-A | III-B | III-C | III-D | III-E | III-F | III-G | III-H | III-I |
|---|---|---|---|---|---|---|---|---|---|
| Mooney viscosity of formulation ML$_{1+4}$ 100° C. | 60 | 62 | 58 | 63 | 62 | 40 | 60 | 66 | 65 |
| Mill behavior* | ⊚ | ○ | ⊚ | ⊚ | ⊚ | x Sticky | ○ | ○ | ○ |
| Hardness (JIS-A) | 65 | 65 | 68 | 67 | 67 | 65 | 65 | 66 | 65 |
| 300% modulus (kg/cm$^2$) | 110 | 105 | 117 | 115 | 112 | 95 | 108 | 107 | 105 |
| Tensile strength (kg/cm$^2$) | 265 | 253 | 258 | 260 | 250 | 210 | 235 | 220 | 230 |
| Elongation (%) | 520 | 525 | 525 | 520 | 520 | 480 | 510 | 500 | 500 |
| Lupke resilience | | | | | | | | | |
| Room temperature (%) | 57 | 58 | 60 | 55 | 57 | 57 | 56 | 50 | 55 |
| 70° C. (%) | 65 | 65 | 66 | 64 | 64 | 60 | 59 | 58 | 60 |
| Goodrich heat build-up 50° C. (°C.) | 34 | 34 | 33 | 33 | 34 | 45 | 40 | 42 | 35 |
| Pico wear resistance (index) | 125 | 125 | 165 | 128 | 135 | 108 | 110 | 103 | 100 |
| Wet skid resistance (index) | 96 | 92 | 86 | 100 | 95 | 100 | 96 | 100 | 100 |

⊚ Excellent
○ Good
△ Fair
x Poor

From the results of Table III-4, it is clear that the samples III-A to III-E, which are examples of the present invention, are superior in physical properties and workability compared with III-F to III-I, which are comparative examples. Specifically, the sample III-A, which is a polymer (polymer composition) of the present invention, is superior in each of the workability, tensile strength, resilience, heat build-up, and wear resistance compared with the corresponding polymer blend of sample III-G. Further, the same applies in the comparison of the sample III-D of the present invention and the sample III-H, which is the corresponding polymer blend. The samples III-A to III-E of the present invention are superior compared with the comparative example samples III-F to III-I in particular in the balance of the wear resistance and the wet skid resistance.

Example III-6 and Comparative Example III-5 and III-6

Sixty parts by weight of samples III-A, III-G and III-I and 40 parts by weight of natural rubber, for a total of 100 parts by weight, were used as raw rubber and similarly formulated, vulcanized, and evaluated. The results are shown in Table III-5.

From the results of Table III-5, it is clear that Example III-5 of the present invention (sample III-A) is superior to Comparative Example III-5 (sample III-G) and III-6 (sample III-I) in both physical properties and workability. In particular, it is superior in the balance of the wear resistance and the wet skid resistance. Even in the case of use of the polymer (polymer composition) of the present invention blended with natural rubber, therefore, the superior features of the polymer (polymer composition) can be exhibited.

TABLE III-5

| | Ex. III-6 | Comp. Ex. III-5 | Comp. Ex. III-6 |
|---|---|---|---|
| Sample | | | |
| III-A (parts by weight) | 60 | — | — |
| III-G (parts by weight) | — | 60 | — |
| III-I (parts by weight) | — | — | 60 |
| Natural rubber (parts by weight) | 40 | 40 | 40 |
| Mooney viscosity of formulation ML$_{1+4}$ 100° C. | 50 | 52 | 55 |
| Mill behavior | ⊚ | ○ | ○ |
| Hardness (JIS-A) | 64 | 64 | 63 |
| 300% modulus (kg/cm$^2$) | 115 | 110 | 110 |
| Tensile strength (kg/cm$^2$) | 278 | 255 | 250 |
| Elongation (%) | 540 | 530 | 525 |
| Lupke resilience | | | |
| Room temperature (%) | 59 | 58 | 57 |
| 70° C. (%) | 66 | 61 | 62 |
| Goodrich heat build-up 50° C. (°C.) | 30 | 34 | 31 |
| Pico wear resistance (index) | 120 | 107 | 100 |
| Wet skid resistance (μ) | 95 | 95 | 98 |

Examples III-7 to III-9 and Comparative Examples II-7 to III-10

Samples III-A, III-D, III-G, and III-H and butadiene-styrene copolymer rubber were used as raw rubber and formulated by the formulation shown in Table III-3, vulcanized, and evaluated. The raw rubber compositions and the results are shown in Table III-6.

From the results of Table III-6, it is clear that the Examples III-7 to III-9 of the present invention were vastly improved in the balance of the wear resistance and the wet skid resistance compared with Comparative Examples III-7 to III-10.

TABLE III-6

| | Examples | | | Comparative Examples | | | |
|---|---|---|---|---|---|---|---|
| | III-7 | III-8 | III-9 | III-7 | III-8 | III-9 | III-10 |
| Sample | | | | | | | |
| III-A (parts by weight) | 50 | 30 | — | — | — | — | — |
| III-D (parts by weight) | — | — | 40 | — | — | — | — |
| III-G (parts by weight) | — | — | — | 50 | 30 | — | — |
| III-H (parts by weight) | — | — | — | — | — | 40 | — |
| SBR 1502 | 50 | 70 | 60 | 50 | 70 | 60 | 100 |
| Lupke resilience (%) 70° C. | 60 | 59 | 59 | 57 | 56 | 55 | 57 |
| Pico wear resistance (index) | 125 | 120 | 118 | 110 | 108 | 105 | 100 |
| Wet skid resistance (index) | 98 | 100 | 99 | 97 | 99 | 99 | 100 |

EXAMPLE GROUP IV

Example IV-1

Two 10 liter internal capacity, stainless steel reactors with a ratio of height to diameter (L/D) of 4 and equipped with agitators and jackets were connected in series. From the bottom of the first reactor was continuously fed an n-hexane solution of 1,3-butadiene and, as a catalyst, lanthanum varsaticate, dibutyl magnesium, and butyl lithium. The internal temperature was maintained at 80° C. and the polymerization performed. The concentration of the monomer mixture was 20% by weight and the feed rate of the monomer was 0.67 kg/hr. The amount of feed of the catalyst was 0.10 mmole of lanthanum varsaticate, 0.50 mmole of dibutyl magnesium, and 0.10 mmole of n-butyl lithium per 100 g of monomer.

Sampling was performed from the outlet of the first reactor and the conversion measured and found to be 67%. The microstructure of the resultant polymer was 86% trans, 5% vinyl, and 9% cis. The glass transition temperature by DSC was $-85°$ C., the crystalline melting point was $+82°$ C., the molecular weight $\overline{M}w$ by GPC was 120,000, the $\overline{M}n$ was 57,000, the molecular weight distribution $\overline{M}w/\overline{M}n$ was 2.1, and the GPC graph was a smooth single peak.

The polymer solution from the first reactor was introduced into the bottom of the second reactor. An additional monomer mixture comprised of 1,3-butadiene, styrene, and n-hexane and n-butyl lithium and tetramethylethylenediamine were introduced from the bottom of the second reactor. The concentration of the monomer mixture was 16% by weight, the feed rate of the 1,3-butadiene was 0.875 kg/hr, and the feed rate of the styrene was 0.365 kg/hr.

The amount of the n-butyl lithium introduced into bottom of the second reactor was 0.74 mmole per 100 g monomer introduced into the second reactor. The tetramethylethylenediamine was introduced to the second reactor in an amount three times the molar amount of the n-butyl lithium. The internal temperature of the second reactor was maintained at 90° C. for the polymerization, then the polymer solution from the second reactor was continuously mixed with 0.6 phr of 2,4-ditertiary butyl-p-cresol (parts by weight per 100 parts of rubber). This was mixed and introduced into hot water for steam stripping and the solvent removed. The resultant rubber was dried by a hot roll. This was used as sample IV-A.

The conversion at the second reactor outlet was 98.5% of the 1,3-butadiene and 98.0% of the styrene. The microstructure of the resultant rubber was determined by the Hampton method using an infrared spectrophotometer and was found to be 19% by weight of bound styrene. The microstructure of the polybutadiene portion was 40% trans, 43% vinyl, and 17% cis. The Mooney viscosity $ML_{1+4}$ (100° C.) was 54, the average molecular weight $\overline{M}w$ by GPC was 230,000, the $\overline{M}n$ was 105,000, the $\overline{M}w/\overline{M}n$ was 2.2, and the GPC graph was a smooth single peak. Further, the block styrene content was 0% per total rubber. Note that the measurement of the block styrene was performed by the osmic acid decomposition method (J. Poly. Sci. 1, 429 (1946)).

The isolated styrene, according to the ozone decomposition-GP method, was 72% by weight of the total bound styrene and the long chain block styrene (chains of 8 or more styrene units) was 0.4% by weight of the total bound styrene, so the product was a completely random copolymer.

From the above results, the 86% trans resinous polybutadiene portion polymerized at the first reactor was 23% by weight of the total polymer obtained, the low trans rubbery styrene-butadiene copolymer portion polymerized at the second reactor was 77% by weight, and the microstructure of the low trans rubbery styrene-butadiene copolymer polymerized at the second reactor was 26% trans, 55% vinyl, and 19% cis.

Two grams of the resultant polymer was heated and dissolved in 100 ml of a mixed solvent of n-hexane and cyclohexane, then this was cooled to 0° C. and centrifuged while held at 0° C and the precipitate and solution separated. The resultant precipitate was vacuum dried and then weighed, whereupon it was found that it was 0.8% by weight of the polymer. In other words, the high trans resinous polybutadiene homopolymer was 7.2% by weight of the polymer of the first reactor (total of the high trans resinous polybutadiene block portion in block polymer and high trans resinous polybutadiene homopolymer).

By way of reference, the high trans resinous polybutadiene homopolymer sampled from the first reactor and the low trans rubbery butadiene styrene random copolymer polymerized by n-butyl lithium alone (bound styrene of 25% by weight, block styrene of 0%, $\overline{M}w$ of 200,000, $\overline{M}w/\overline{M}n$ of 2.0, microstructure of 26% trans, 55% vinyl, and 19% cis) were blended 50:50 and separation performed separately, whereupon the resultant sediment was 45% by weight of the polymer blend.

It is discovered that the polymer obtained from this is a polymer composition having as principal components a block polymer comprised of a high trans resinous polybutadiene block and a low trans high vinyl rubbery butadiene-styrene random copolymer and a low trans high vinyl rubbery polybutadiene-styrene random copolymer.

The cold flow of the resultant polymer was measured, whereupon it was found that there was substantially no cold flow.

Trans butadiene polymer: No cold flow even after three days

Tufdene 2000 (commercially available product): Collapse after 2 days (a rectangular parallel piped rubber sample of 3 cm × 3 cm × 10 cm (height) was fixed to a 30 degree slanted base and the slanting state observed.)

Examples IV-2 to IV-4

The same method was followed as in Example IV-1. However, the monomer feed rate, composition, amount of catalyst, Lewis base content, polymerization temperature, etc., of the first and second reactors were changed. The resultant polymers were used respectively as the sample IV-B to IV-D. The analysis values are shown in Table IV-1. The obtained samples IV-B to IV-D were subjected to a cold flow test in the same way as Example IV-1, whereupon it was found there was no cold flow even after three days.

TABLE IV-1

| | Examples | | | |
|---|---|---|---|---|
| | IV-1 | IV-2 | IV-3 | IV-4 |
| Analysis values of polymer of outlet of first reactor | | | | |
| Glass transition temperature | −85° C. | −85° C. | −85° C. | −85° C. |
| Crystalline melting point | +82° C. | +82° C. | +85° C. | +82° C. |
| Microstructure | | | | |
| Trans | 86% | 86% | 87% | 86% |
| Vinyl | 5% | 6% | 5% | 5% |
| Cis | 9% | 10% | 8% | 9% |
| Molecular weight $\overline{Mw}$ ($\times 10^4$) | 12 | 15 | 8 | 10 |
| Molecular weight distribution $\overline{Mw}/\overline{Mn}$ | 2.1 | 2.3 | 2.1 | 2.2 |
| Analysis values of polymer of outlet of second reactor | | | | |
| Bound styrene wt % | 19 | 10 | 6.5 | 31.5 |
| Block styrene wt % | 0 | 0 | 0 | 0 |
| Microstructure | | | | |
| Trans | 40% | 52% | 31% | 32% |
| Vinyl | 43% | 31% | 56% | 50% |
| Cis | 17% | 17% | 13% | 18% |
| Molecular weight $\overline{Mw}$ ($\times 10^4$) | 23 | 21 | 23 | 27 |
| Molecular weight distribution $\overline{Mw}/\overline{Mn}$ | 2.2 | 2.3 | 2.1 | 2.1 |
| Mooney viscosity $ML_{1+4}$ (100° C.) | 54 | 45 | 50 | 60 |
| Ratio of high trans PB polymerized in first reactor | 23 wt % | 35 wt % | 18 wt % | 10 wt % |
| Ratio of high trans homopolymer by separation | | | | |
| To total polymer | 0.8 wt % | 0.5 wt % | 0.8 wt % | 0.65 wt % |
| To high trans polybutadiene polymerized in first reactor | 3.5 wt % | 1.4 wt % | 4.4 wt % | 6.5 wt % |
| Low trans polymer polymerized in second reactor | | | | |
| Bound styrene wt % | 25 | 15 | 8 | 35 |
| Block styrene wt % | 0 | 0 | 0 | 0 |
| Microstructure | | | | |
| Trans | 26% | 33% | 19% | 26% |
| Vinyl | 55% | 45% | 67% | 55% |
| Cis | 19% | 22% | 14% | 19% |
| Samples | IV-A | IV-B | IV-C | IV-D |

Comparative Example IV-1

Into a 5 liter reactor equipped with an agitator and jacket were introduced 945 g of a cyclohexane mixture containing 161 g of 1,3-butadiene and 28 g of styrene, then a Ba-Mg-Al initiator (Ba/Mg/Al=0.18/0.57/0.04 unit mmole/100 g monomer, described in U.S. Pat. No. 4,297,240) was added and polymerization performed at 60° C. for 1 hour. Part of this was sampled, then 1155 g of cyclohexane mixture containing 231 g of 1,3-butadiene and a cyclohexane solution of Na tertiary amylate and TMEDA (Na/Mg molar ratio—0.77, TMEDA/Mg molar ratio of 0.61) were added and the polymerization performed at 50° C. for one hour. After this, methanol was added to stop the reaction, then the same procedure was in Example IV-1 was followed and the polymer obtained. Analysis values of the resultant polymer and the midway sampling are given in Table IV-2.

Comparative Example IV-2

The same procedure was followed as in Comparative Example IV-1. However, the Ba-Mg-Al initiator was added and the polymerization carried out at 60° C. for 5 hours. To this was added the Na tertiary amylate and TMEDA and the polymerization continued at 50° C. for 1 hour. The resultant polymer was used as sample IV-E. The results are shown in Table IV-2.

The TSBR polymer sampled midway, like in Example IV-1, could not be crystallized by the method of use of a mixed solvent of n-hexane and cyclohexane. Further, the same applied to the polymer finally obtained. The cold flow of the resultant polymer was evaluated by the method shown in Example IV-1 and the result was "collapse in one day", which is not desirable.

TABLE IV-2

| | Midway sampling | | | | Final polymer | | | | | |
|---|---|---|---|---|---|---|---|---|---|---|
| | Conversion (%) | Trans content *1 (%) | Bound styrene *1 (wt %) | Weight average molecular weight | Conversion (%) | Trans content *1 (%) | Vinyl content *1 (%) | Bound styrene *1 (wt %) | Weight average molecular weight | Mw/Mn |
| Comp. Ex. IV-1 | 18 | 77 | 4 | $0.7 \times 10^4$ | 90 | 30 | 55 | 6 | $8 \times 10^4$ | 2.8 |
| Comp. Ex. IV-2 | 55 | 76 | 5 | $2.1 \times 10^4$ | 83 | 40 | 43 | 5 | $7 \times 10^4$ | 3.5 |

*1: Measured using infrared spectrophotometer and Hampton method.

Comparative Example IV-3 (Sample IV-F)

Using the same method as in Example IV-1, the polymer of the first reactor was sampled and a high trans resinous polybutadiene homopolymer was obtained (sample IV-F-1).

Using n-butyl lithium and tetramethylethylenediamine, ordinary high vinyl butadiene-styrene random copolymer ($ML_{1+4}$ (100° C.) of 55, $\overline{Mw}$ of 240,000, $\overline{Mw}/\overline{Mn}$ of 2.1, bound styrene of 26% by weight, 26% trans, 55% vinyl, and 19% cis) was obtained (sample IV-F-2).

Twenty-three parts by weight of sample IV-F-1 and 77 parts by weight of sample IV-F-2 were blended to make sample IV-F.

Comparative Example IV-4 (Sample IV-G)

Using the same method as in Example IV-1, the polymer of the first reactor was sampled and a high trans resinous polybutadiene homopolymer was obtained (sample IV-F-1).

Using n-butyl lithium and tetramethyl ethylene diamine, ordinary high vinyl butadiene-styrene random copolymer ($ML_{1+4}$ (100° C.) of 60, $\overline{M}w$ of 230,000, $\overline{M}w/\overline{M}n$ of 2.1, bound styrene of 35% by weight, block styrene of 0%, 26% trans, 55% vinyl, and 19% cis) was obtained (sample IV-G-2).

Ten parts by weight of sample IV-F-1 and 90 parts by weight of sample IV-G-2 were blended to make sample IV-G.

Comparative Example IV-5 (Sample IV-H)

Using n-butyl lithium and tetramethyl ethylene diamine, ordinary high vinyl butadiene-styrene random copolymer ($ML_{1+4}$ (100° C.) of 55, $\overline{M}w$ of 250,000, $\overline{M}w/\overline{M}n$ of 2.1, bound styrene of 19% by weight, block styrene of 0% by weight, 34% trans, 43% vinyl, and 23% cis) was obtained and used as sample IV-H.

Evaluation

The samples IV-A to IV-H were formulated by the formulation shown in Table IV-3 vulcanized, and evaluated as to performance according to the same methods as mentioned above. The results are shown in Table IV-4.

TABLE IV-3

| Formulation | Parts by weight |
| --- | --- |
| Raw rubber | 100 |
| Aromatic oil *1 | 5 |
| N-399 carbon black *2 | 45 |
| Stearic acid | 2 |
| Zinc oxide | 5 |
| Accelerator CZ *3 | 1 |
| Sulfur | 1.7 |

*1: Kyodo Sekiyu Co. X-140
*2: Iodine adsorption (IA) 90 mg/g Dibutylphthalate adsorption (DBP) 199 ml/100 g
*3: N-cyclohexyl-2-benzothiazylsulfenamide Vulcanization conditions: 160° C. × 20 minutes

TABLE IV-4

| Sample | IV-A | IV-B | IV-C | IV-D | IV-E | IV-F | IV-G | IV-H |
| --- | --- | --- | --- | --- | --- | --- | --- | --- |
| Mooney viscosity of formulation $ML_{1+4}$ 100° C. | 80 | 70 | 78 | 85 | 55 | 90 | 93 | 85 |
| Mill behavior* | ⊚ | ⊚ | ⊚ | ⊚ | x Sticky | ○ | ○ | Δ |
| Hardness (JIS-A) | 66 | 69 | 67 | 68 | 65 | 66 | 68 | 66 |
| 300% modulus (kg/cm$^2$) | 135 | 140 | 126 | 132 | 105 | 122 | 126 | 120 |
| Tensile strength (kg/cm$^2$) | 245 | 258 | 235 | 260 | 165 | 218 | 235 | 210 |
| Elongation (%) | 430 | 420 | 435 | 440 | 380 | 410 | 430 | 410 |
| Lupke resilience | | | | | | | | |
| Room temperature (%) | 47 | 53 | 47 | 38 | 56 | 46 | 35 | 43 |
| 70° C. (%) | 61 | 64 | 60 | 56 | 59 | 56 | 52 | 60 |
| Goodrich heat build-up 50° C. (°C.) | 30 | 30 | 30 | 34 | 49 | 37 | 39 | 31 |
| Pico wear resistance (index) | 125 | 140 | 130 | 102 | 130 | 105 | 90 | 100 |
| Wet skid resistance (index) | 100 | 93 | 95 | 110 | 85 | 99 | 109 | 100 |

*⊚ ... Excellent
○ ... Good
Δ ... Fair
x ... Poor

From the results of Table IV-4, it is clear that the samples IV-A to IV-D, which are examples of the present invention, are superior in physical properties and workability compared with IV-E to IV-H, which are comparative examples. Specifically, the sample IV-A, which is a polymer (polymer composition) of the present invention, is superior in each of the workability, tensile strength, resilience, heat build-up, and wear resistance compared with the corresponding polymer blend of sample IV-F. Further, the same applies in the comparison of the sample IV-D of the present invention and the sample IV-G, which is the corresponding polymer blend. The samples IV-A to IV-D of the present invention are superior compared with the comparative example samples IV-E to IV-H in particular in the balance of the wear resistance and the wet skid resistance.

Example IV-5 and Comparative Examples IV-6 and IV-7

Sixty parts by weight of samples IV-A, IV-F, and IV-H and 40 parts by weight of natural rubber, for a total of 100 parts by weight, were used as raw rubber and similarly formulated, vulcanized, and evaluated. The results are shown in Table IV-5.

From the results of Table IV-5, it is clear that Example IV-5 of the present invention (sample IV-A) is superior to Comparative Example IV-5 (sample IV-F) and IV-6 (sample IV-H) in both physical properties and workability. In particular, it is superior in the balance of the wear resistance and the wet skid resistance. Even in the case of use of the polymer (polymer composition) of the present invention blended with natural rubber, therefore, the superior features of the polymer (polymer composition) can be exhibited.

TABLE IV-5

| | Ex. IV-5 | Comp. Ex. IV-6 | Comp. Ex. IV-7 |
| --- | --- | --- | --- |
| Sample | | | |
| IV-A (parts by weight) | 60 | — | — |
| IV-F (parts by weight) | — | 60 | — |
| IV-H (parts by weight) | — | — | 60 |
| Natural rubber (parts by weight) | 40 | 40 | 40 |
| Mill behavior* | ⊚ | ○ | ○ |
| Hardness (JIS-A) | 65 | 65 | 64 |
| 300% modulus (kg/cm$^2$) | 130 | 120 | 115 |
| Tensile strength (kg/cm$^2$) | 265 | 245 | 240 |
| Elongation (%) | 460 | 450 | 450 |
| Lupke resilience | | | |
| Room temperature (%) | 53 | 52 | 50 |
| 70° C. (%) | 63 | 60 | 62 |
| Goodrich heat build-up 50° C. (°C.) | 28 | 32 | 30 |
| Pico wear resistance (index) | 120 | 110 | 105 |

TABLE IV-5-continued

|  | Ex. IV-5 | Comp. Ex. IV-6 | Comp. Ex. IV-7 |
| --- | --- | --- | --- |
| Wet skid resistance ($\mu$) | 95 | 95 | 95 |

*⊙ ... Excellent
o ... Good
△ ... Fair
x ... Poor

Examples IV-6 to IV-8 and Comparative Examples IV-8 to IV-12

Samples IV-A, IV-D, IV-F, IV-G, and IV-H and butadiene-styrene copolymer rubber were used as raw rubber and formulated by the formulation shown in Table IV-3, vulcanized, and evaluated. The raw rubber compositions and the results are shown in Table IV-6.

From the results of Table IV-6, it is clear that the Example IV-7 (sample IV-A) is somewhat superior in the balance of the resilience and wet skid resistance compared with Comparative Examples IV-8 (sample IV-F and IV-9 (sample IV-H) and is striking superior over the same in the balance of the wear resistance and the wet skid resistance.

Example IV-8 (sample IV-D) is somewhat superior in the Lupke resilience compared with Comparative Example IV-10 (IV-G) and is strikingly superior in the balance of the wear resistance and wet skid resistance.

TABLE IV-6

|  | Ex. IV-6 | Ex. IV-7 | Comp. Ex. IV-8 | Comp. Ex. IV-9 | Ex. IV-8 | Comp. Ex. IV-10 | Comp. Ex. IV-11 |
| --- | --- | --- | --- | --- | --- | --- | --- |
| Sample |  |  |  |  |  |  |  |
| IV-A (parts by weight) | 50 | 30 | — | — | — | — | — |
| IV-F (parts by weight) | — | — | 50 | — | — | — | — |
| IV-H (parts by weight) | — | — | — | 50 | — | — | — |
| IV-D (parts by weight) | — | — | — | — | 50 | — | — |
| IV-G (parts by weight) | — | — | — | — | — | 50 | — |
| SBR 1502 | 50 | 70 | 50 | 50 | 50 | 50 | 100 |
| Lupke resilience (%) 70° C. | 59 | 58 | 56 | 56 | 57 | 57 | 56 |
| Pico wear resistance (index) | 105 | 101 | 93 | 88 | 93 | 75 | 100 |
| Wet skid resistance (index) | 104 | 103 | 104 | 105 | 110 | 108 | 100 |

EXAMPLE GROUP V

Examples V-1 to V-7 and Comparative Examples V-1 to V-3

Using the butadiene polymers V-A to V-J shown in Table V-1 as toughening agents, high impact polystyrene resin was obtained by the bulk polymerization explained below. Here, the polymers V-A to V-G are the butadiene polymers of the present invention and are obtained by the method described in the specification of the present invention. The polybutadiene rubber V-J is an ordinary low cis polybutadiene rubber obtained using butyl lithium as a catalyst or a high trans polybutadiene rubber shown in the specification of Japanese Unexamined Patent Publication (Kokai) No. 60-10411.

The bulk polymerization was performed by the following method. Eight parts of the above-mentioned polymers V-A to V-J (rubber) were dissolved in 92 parts of styrene and 8 parts of ethylbenzene, then 0.05 part by weight of benzoyl peroxide and 0.10 part by weight alpha-methyl styrene dimer were added to the styrene and polymerization performed at 80° C. for 4 hours, 110° C. for 4 hours, and 150° C. for 4 hours under agitation. Further, heat treatment was performed at around 230° C. for 30 minutes. After this, the unreacted styrene and ethylbenzene were removed by vacuum and polystyrene resin having a particle size of about 1.5 micron, gel fraction of about 30%, and swelling index of about 8 was obtained. This was pulverized, then pelletized by an extruder, injection molded, and the physical properties measured. The results are shown in Table V-2.

From the results of Table V-2, it is learned that the high impact polystyrene resin obtained using the butadiene polymer of the present invention as a toughening agent has extremely superior performance. That is, the polystyrene resin of the examples, comprised of the specified butadiene polymer (polymer composition), polymers V-A to V-G, of the present invention, has superior impact strength, in particular has superior impact strength at low temperature, and has a high flexural modulus. Further, it is superior in external appearance, as expressed by gloss, and is superior to the polystyrene resin of the comparative examples in the balance of the three.

Example V-8 and Comparative Example V-4

The same procedures were followed as in Example V-1 and Comparative Example V-3, except that the butadiene polymer and the styrene were changed to 15 parts by weight and 85 parts by weight, respectively. The results obtained are shown in Table V-2. It is learned that even in a high impact polystyrene resin with a large rubber content, the superior effects of the present invention can be exhibited.

Example V-10 and Comparative Example V-3

High impact polystyrene resin was obtained by bulk suspension polymerization. Six parts by weight of the polymers V-A and V-I were dissolved as toughening agents in 94 parts by weight of styrene and polymerization performed under agitation until the styrene conversion became about 30% for about 5 hours. This was suspended in 150 parts by weight of water containing 3 parts by weight of calcium triphosphate and 0.02 part by weight of sodium dodecylbenzene sulfonate. To the suspension was added 0.3 part by weight of benzoyl peroxide and 0.05 part by weight of ditertiary butyl peroxide, then the mixture polymerized at 80° C. for 2 hours, at 110° C. for 2 hours, and further at 130° C. for 2 hours to complete the polymerization. The resultant suspended particles were filtered out, dried, pelletized by an extruder, injection molded, and measured as to physical properties. The results are shown in Table V-2. By incorporating the high trans polymer in a block form, the effect of the present invention of remarkable improvement on the defect of the reduced impact strength at low temperature can also be exhibited even with a bulk suspension polymerization method of production of styrene resin.

TABLE V-1

|  | V-A | V-B | V-C | V-D | V-E | V-F | V-G | V-H | V-I | V-J |
|---|---|---|---|---|---|---|---|---|---|---|
| Structure of resinous polybutadiene block |  |  |  |  |  |  |  |  |  |  |
| Glass transition temperature (°C.) | −85 | −84 | −87 | −86 | −85 | −86 | −84 | −85 | — | — |
| Crystalline melting point (°C.) | 82 | 80 | 83 | 85 | 85 | 80 | 88 | 80 | — | — |
| Microstructure (%) |  |  |  |  |  |  |  |  |  |  |
| Trans | 87 | 86 | 87 | 88 | 85 | 83 | 90 | 86 | — | — |
| Cis | 9 | 10 | 10 | 9 | 10 | 11 | 7 | 9 | — | — |
| Vinyl | 4 | 4 | 3 | 3 | 5 | 6 | 3 | 5 | — | — |
| Molecular weight (×10$^4$) | 10.5 | 10.2 | 12.1 | 8.3 | 5.3 | 7.4 | 10.2 | 17.3 | — | — |
| Structure of rubbery polybutadiene block and rubbery polybutadiene homopolymer |  |  |  |  |  |  |  |  |  |  |
| Glass transition temperature (°C.) | −92 | −93 | −92 | −93 | −92 | −92 |  | −87 | −93 |  |
| Crystalline melting point (°C.) | None | None | None | None | None | None | None |  | None | None |
| Microstructure (%) | 52 | 54 | 53 | 53 | 52 | 52 | 52 |  | 70 | 52 |
| Trans |  |  |  |  |  |  |  |  |  |  |
| Cis | 35 | 34 | 35 | 35 | 35 | 35 | 35 | — | 22 | 35 |
| Vinyl | 13 | 12 | 12 | 12 | 13 | 13 | 13 | — | 8 | 13 |
| Molecular weight (×10$^4$) | 9.5 | 10.8 | 15.3 | 7.4 | 15.7 | 13.2 | 12.3 | — | 16.5 | 18.2 |
| Resinous component/rubbery component ratio | 1/9 | 3/7 | 3/7 | 5/5 | 1/9 | 1/9 | 1/9 | 10/0 | 0/10 | 0/10 |
| ML viscosity (L rotor, 100° C.) | 33 | 56 | 87 | 43 | 37 | 24 | 37 | 40 | 44 | 37 |
| SV (5% styrene solution, 25° C.) (centipoise) | 67 | 72 | 133 | 38 | 83 | 54 | 59 | 47 | 73 | 78 |

TABLE V-2

|  | Examples |  |  |  |  |  |  | Comparative Examples |  |  |
|---|---|---|---|---|---|---|---|---|---|---|
|  | V-1 | V-2 | V-3 | V-4 | V-5 | V-6 | V-7 | V-1 | V-2 | V-3 |
| Rubber used as toughening agent | A | B | C | D | E | F | G | H | I | J |
| Izod impact strength *1) |  |  |  |  |  |  |  |  |  |  |
| Room temperature (23° C.) | 12.0 | 11.5 | 12.4 | 11.2 | 11.4 | 11.0 | 11.2 | 11.0 | 9.7 | 9.3 |
| Low temperature (−30° C.) | 6.5 | 6.3 | 6.7 | 6.2 | 6.3 | 6.0 | 6.0 | 3.3 | 4.5 | 5.6 |
| Flexural modulus *2) | 23,000 | 24,000 | 23,500 | 24,500 | 23,000 | 22,500 | 23,500 | 24,000 | 23,000 | 22,000 |
| Gloss *3) | 80 | 83 | 76 | 87 | 84 | 88 | 88 | 80 | 74 | 62 |

|  | Ex. V-8 | Comp. Ex. V-4 | Ex. V-9 | Comp. Ex. V-5 |
|---|---|---|---|---|
| Rubber used as toughening agent | A | J | A | I |
| Izod impact strength *1) |  |  |  |  |
| Room temperature (23° C.) | 15.3 | 14.4 | 9.3 | 9.2 |
| Low temperature (−30° C.) | 8.5 | 7.1 | 6.4 | 3.7 |
| Flexural modulus *2) | 18,000 | 16,500 | 23,500 | 23,500 |
| Gloss *3) | 60 | 42 | 75 | 74 |

*1): According to JIS K-7110. Units of kg·cm/cm
*2): According to ASTM-D 790. Units of kg/cm$^2$
*3): According to JIS-ZZ-8741. (incident angle of 60°)

We claim:

1. A diene block polymer comprising (A) a resinous polybutadiene block having a glass transition temperature of −80° C. or less, a crystalline melting point of 30° to 130° C., 80% to 93% of trans units, 5 to 15% of cis units, and 2 to 10% of vinyl units, a molecular weight of 10,000 to 200,000, and a molecular weight distribution $\overline{Mw}/\overline{Mn}$ of 1.2 to 4 and (B) a conjugated diene rubbery block selected from the group consisting of a polybutadiene having a glass transition temperature of −70° C. or less, 20 to 60% trans units, 20 to 40% cis units, and 10 to 40% vinyl units, a molecular weight of 20,000 to 400,000, and a molecular weight distribution ($\overline{Mn}/\overline{Mn}$) of 1.5 to 5, a butadiene styrene random copolymer having a bound styrene content of 1 to 50% by weight, 20 to 60% trans units, 20 to 40% cis units, 10 to less than 40% vinyl units, a molecular weight of 20,000 to 400,000, and a molecular weight distribution ($\overline{Mw}/\overline{Mn}$) of 1.1 to 5 and a butadiene styrene random copolymer having a bound styrene content of 1 to 50% by weight, 10 to 40% trans units, 10 to 30% cis units, and 40 to 80% vinyl units, a molecular weight of 20,000 to 400,000 and a molecular weight distribution ($\overline{Mw}/\overline{Mn}$) of 1.1 to 5, wherein the ratio by weight of block (A) to block (B) is 2 to 80:98 to 20.

2. The diene block polymer as claimed in claim 1, wherein the resinous polybutadiene block (A) has a glass transition temperature of −83° C. to −120° C., a crystalline melting point of 40° C. to 120° C., 83% to 93% trans units, and a molecular weight of 30,000 to 150,000.

3. The diene block polymer as claimed in claim 1, wherein the resinous polybutadiene block (A) has a glass transition temperature of −85° C. to −110° C., and a crystalline melting point of 50° C. to 110° C.

4. The diene block polymer as claimed in claim 1, wherein the ratio by weight of block (A) to block (B) is 5 to 70:95 to 30 and the molecular weight distribution $\overline{Mw}/\overline{Mn}$ is 1.2 to 3.

5. The diene block polymer as claimed in claim 1, wherein the ratio by weight of block (A) to block (B) is 8 to 60:92 to 40 and the molecular weight distribution $\overline{Mw}/\overline{Mn}$ is 1.2 to 2.

* * * * *